US012724219B2

(12) United States Patent
Park et al.

(10) Patent No.: US 12,724,219 B2
(45) Date of Patent: Sep. 1, 2026

(54) CABLE PULLING ARRANGEMENT

(71) Applicant: CommScope Technologies LLC, Hickory, NC (US)

(72) Inventors: Joshua Jae-Ho Park, Blaine, MN (US); Cyle D. Petersen, Belle Plaine, MN (US)

(73) Assignee: CommScope Technologies LLC, Hickory, NC (US)

( * ) Notice: Subject to any disclaimer, the term of this patent is extended or adjusted under 35 U.S.C. 154(b) by 269 days.

(21) Appl. No.: 18/690,983

(22) PCT Filed: Sep. 9, 2022

(86) PCT No.: PCT/US2022/043114
§ 371 (c)(1),
(2) Date: Mar. 11, 2024

(87) PCT Pub. No.: WO2023/039196
PCT Pub. Date: Mar. 16, 2023

(65) Prior Publication Data

US 2024/0385410 A1 Nov. 21, 2024

Related U.S. Application Data

(60) Provisional application No. 63/242,817, filed on Sep. 10, 2021.

(51) Int. Cl.
*G02B 6/54* (2006.01)
*G02B 6/44* (2006.01)

(52) U.S. Cl.
CPC ........... *G02B 6/545* (2023.05); *G02B 6/4432* (2013.01)

(58) Field of Classification Search
None
See application file for complete search history.

(56) References Cited

U.S. PATENT DOCUMENTS 4,684,211 A 8/1987 Weber et al.
5,480,203 A 1/1996 Favalora et al.
5,863,083 A 1/1999 Giebel et al.
8,831,395 B2 9/2014 Sievers et al.
2005/0002621 A1 1/2005 Zimmel et al.
2005/0111811 A1 5/2005 Cooke et al.
2012/0189256 A1 7/2012 Allen et al.
2013/0016948 A1 1/2013 Smith et al.
2013/0177284 A1 7/2013 Sievers et al.

OTHER PUBLICATIONS

International Search Report and Written Opinion for Application No. PCT/US2022/043114 mailed Jan. 2, 2023.

*Primary Examiner* — Chad H Smith
(74) *Attorney, Agent, or Firm* — Merchant & Gould P.C.

(57) ABSTRACT

A fiber optic cable assembly includes a fiber optic cable having a first section with a jacket surrounding at least one internal fiber optic cable, and a second section where the at least one internal fiber optic cable extends past an end of the jacket. The fiber optic cable further includes a strength member having a first portion extending inside the jacket in the first section, a second portion forming a loop outside of the second section, and a third portion extending outside of the jacket in the first section. A protective wrap surrounds the third portion of the strength member. A cable pulling sleeve is coupled to the loop, and the cable pulling sleeve defines a cavity for enclosing the end of the second section.

15 Claims, 31 Drawing Sheets

CABLE PULLING ARRANGEMENT

CROSS-REFERENCE TO RELATED APPLICATION

This application is a National Stage Application of PCT/US2022/043114, filed on Sep. 9, 2022, which claims the benefit of U.S. Patent Application Ser. No. 63/242,817, filed on Sep. 10, 2021, the disclosures of which are incorporated herein by reference in their entireties. To the extent appropriate, a claim of priority is made to each of the above disclosed applications.

BACKGROUND

Fiber optic cables are often routed through conduits or other enclosed spaces such as aerial tracks, underground pipes, support structures disposed inside walls, and the like to connect fiber optic equipment in different geographical locations. Generally, a pulling structure having a loop at one end is attached to a lead end of the fiber optic cable, and a rope is then attached to the loop of the pulling structure for pulling a fiber optic cable through a conduit or enclosed space.

SUMMARY

In one aspect, a fiber optic cable assembly comprises: a fiber optic cable, including: a first section having a jacket surrounding at least one internal fiber optic cable, the jacket having an end; a second section where the at least one internal fiber optic cable extends past the end of the jacket, and the second section having an end; a strength member having a first portion extending inside the jacket in the first section, the strength member having a second portion forming a loop outside of the second section, and the strength member having a third portion extending outside of the jacket in the first section; and a protective wrap surrounding the third portion of the strength member; and a cable pulling sleeve coupled to the loop, the cable pulling sleeve defining a cavity for enclosing the end of the second section.

In another aspect, a fiber optic cable comprises: a first section having a jacket surrounding at least one internal fiber optic cable, the jacket having an end; a second section where the at least one internal fiber optic cable extends past the end of the jacket, and the second section having an end; a strength member having a first portion extending inside the jacket in the first section, the strength member having a second portion forming a loop outside of the second section, and the strength member having a third portion extending outside of the jacket in the first section; and a protective wrap surrounding the third portion of the strength member.

In another aspect, a method of preparing a fiber optic cable comprises: stripping a jacket to expose at least one internal fiber optic cable and a strength member; looping the strength member to define an anchor point over the exposed at least one internal fiber optic cable, and to have a portion extending outside of the jacket; and applying a protective wrap to surround the portion of the strength member extending outside of the jacket.

DESCRIPTION OF THE FIGURES

The following drawing figures, which form a part of this application, are illustrative of the described technology and are not meant to limit the scope of the disclosure in any manner.

DETAILED DESCRIPTION

Figure 1:
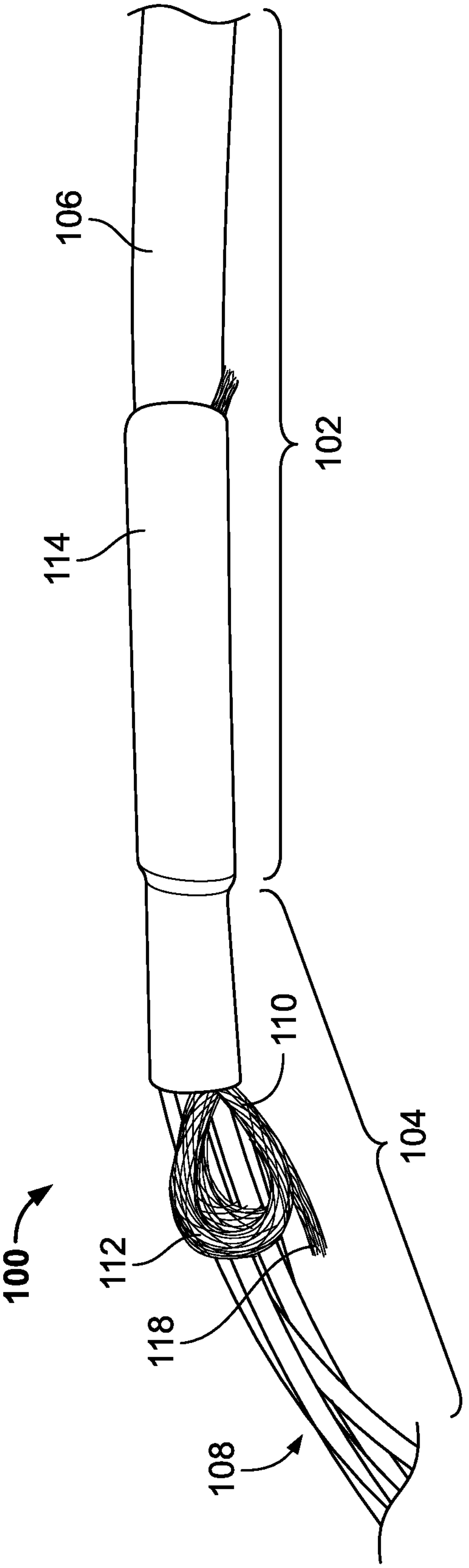
FIGS. 1 and 1A show an example of a fiber optic cable having an anchor point for attaching a pulling sleeve to the fiber optic cable.

Various examples will be described in detail with reference to the drawings, wherein like reference numerals represent like parts and assemblies throughout the several views. Reference to various examples does not limit the scope of the claims attached hereto. Additionally, any examples set forth in this specification are not intended to be limiting and merely set forth some of the many possible examples for the appended claims.

FIG. 1 shows an example of a fiber optic cable 100 having an anchor point for attaching a cable pulling sleeve 400 (shown in FIG. 4) to the cable. The fiber optic cable 100 includes a first section 102 having a jacket 106 surrounding the internal fiber optic cables 108.

The fiber optic cable 100 further includes a second section 104 where the internal fiber optic cables 108 break out from the jacket 106. The fiber optic cable 100 does not include a fan out arrangement for the internal fiber optic cables 108. In the fiber optic cable 100, there are at least six internal fiber optic cables. The fiber optic cable 100 can include more than six internal fiber optic cables or fewer than six internal fiber optic cables.

The fiber optic cable 100 includes a strength member 110 that extends inside the jacket 106 in the first section 102. The strength member 110 imparts axial or tensile strength to the fiber optic cable 100 allowing the cable to better withstand pulling forces without breaking. The strength member 110 can be comprised of a plurality of aramid yarns or similar materials.

Figure 1A:
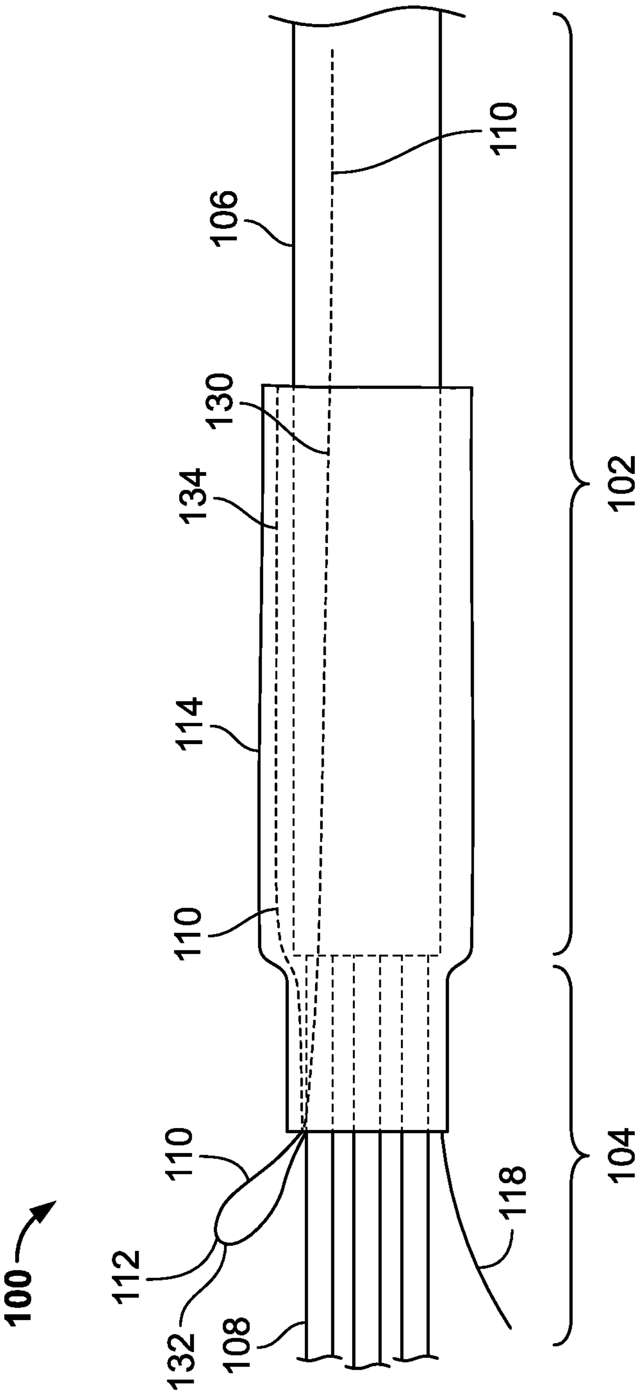

The strength member 110 is formed into a loop 112 that extends over the second section 104, and then extends back over the first section 102 while remaining outside of the jacket 106. As shown in FIG. 1A, the strength member 110 has a first portion 130 extending inside the jacket 106, a second portion 132 defining the loop 112 outside of the second section 104, and a third portion 134 extending outside of the jacket 106. The loop 112 provides the anchor point for attaching the cable pulling sleeve 400 to the fiber optic cable 100.

The fiber optic cable 100 further includes a protective wrap 114 that surrounds the jacket 106, internal fiber optic cables 108, and strength member 110. As shown in FIG. 1, the protective wrap 114 can overlap both the first and second sections 102, 104 of the fiber optic cable 100. The strength member 110 is sandwiched between the protective wrap 114 and the jacket 106 over the first section 102 of the fiber optic cable 100. In some examples, the strength member 110 can be sandwiched between the protective wrap 114 and the internal fiber optic cables 108 over the second section 104 of the fiber optic cable 100. As shown in FIG. 1, the strength member 110 is trimmed at an end opposite the loop 112.

In some examples, the protective wrap 114 includes heat shrink wrap that shrinks when heat is applied to provide a tight fit around the jacket 106, internal fiber optic cables 108, and strength member 110. Alternatively, the protective wrap 114 can include tape or another type of fastener to provide a tight fit around the jacket 106, internal fiber optic cables 108, and strength member 110 of the fiber optic cable 100.

As further shown in FIG. 1, the fiber optic cable 100 includes a rip cord 118 inside the jacket 106 in the first section 102, and which extends outside of the jacket 106 at the second section 104. The rip cord 118 can be used to cut the jacket 106 and the protective wrap 114 to adjust a location where the internal fiber optic cables 108 break out from the jacket 106.

Figure 2:
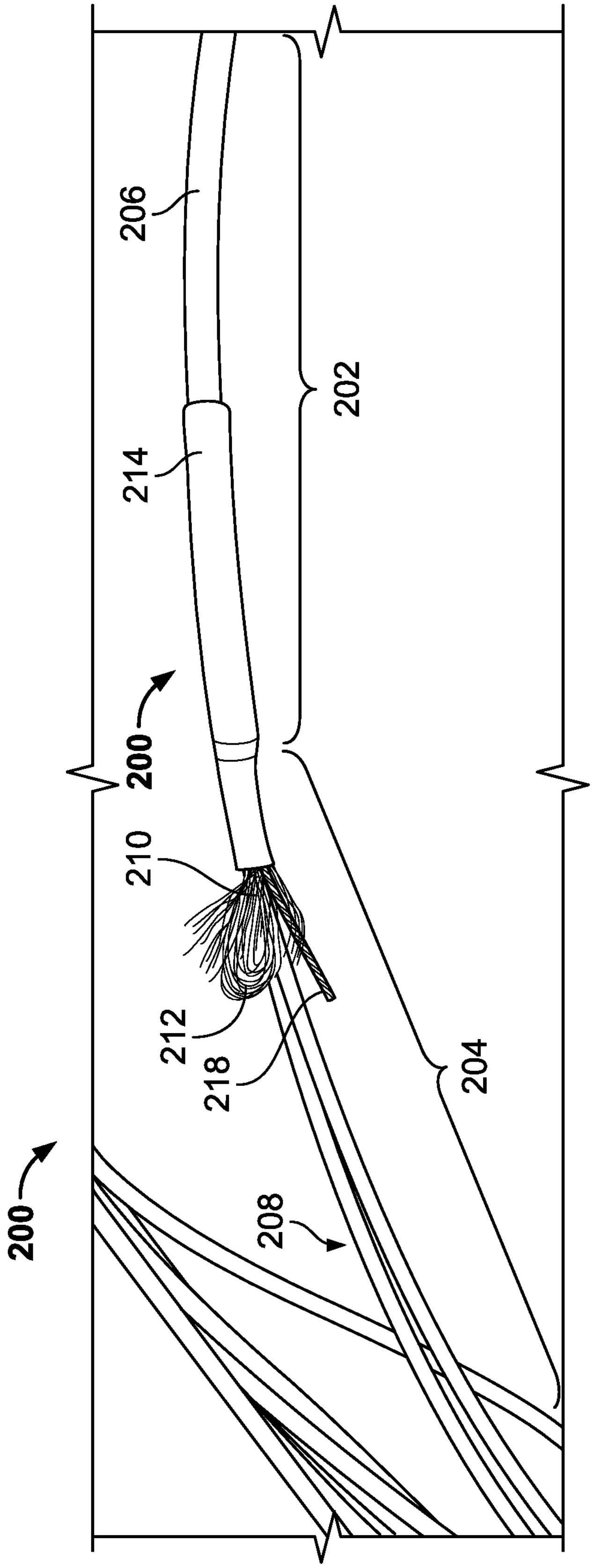
FIG. 2 shows another example of a fiber optic cable having an anchor point for attaching a pulling sleeve to the fiber optic cable.

FIG. 2 shows another example of a fiber optic cable 200 that includes many of the same features of the fiber optic cable 100 including a first section 202 having a jacket 206 surrounding the internal fiber optic cables 208, a second section 204 where the internal fiber optic cables 208 break out from the jacket 206. In the fiber optic cable 200, there are at least two internal fiber optic cables that breakout from the jacket 206. The fiber optic cable 200 can include more than two internal fiber optic cables or a single internal fiber optic cable.

The fiber optic cable 200 does not include a fan out arrangement for the internal fiber optic cables 208. The fiber optic cable 200 further includes a strength member 210 having a loop 212 that provides an anchor point for attaching the cable pulling sleeve 400 to the fiber optic cable 200, a protective wrap 214, and a rip cord 218.

Figure 3:
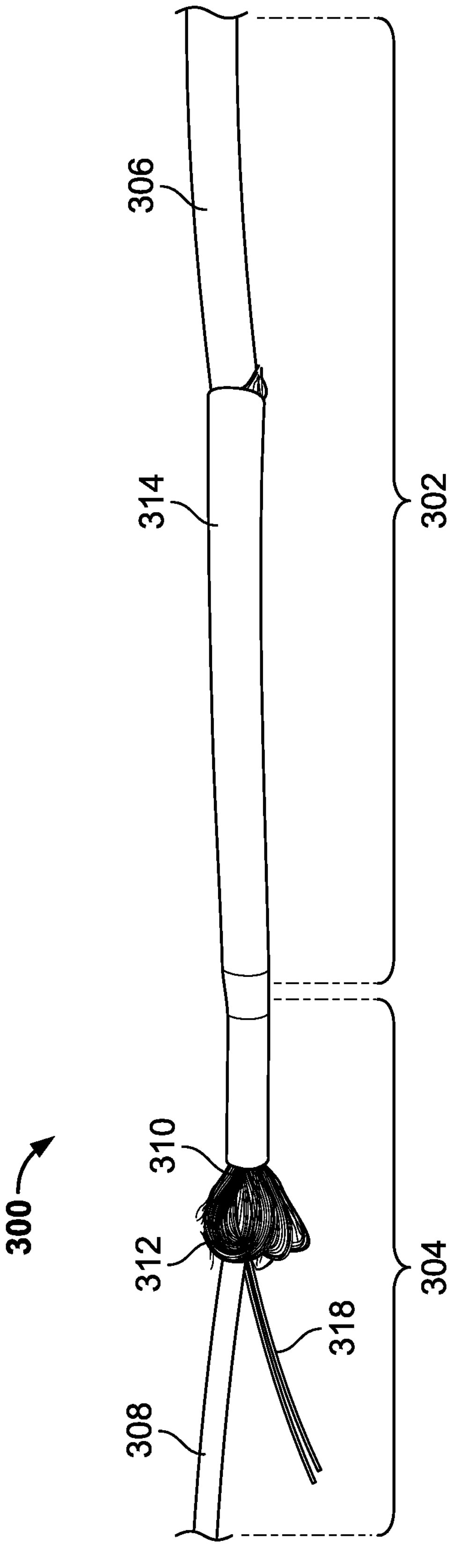
FIG. 3 shows another example of a fiber optic cable having an anchor point for attaching a pulling sleeve to the fiber optic cable.

FIG. 3 shows another example of a fiber optic cable 300 that includes many of the same features of the fiber optic cable 100 including a first section 302 having a jacket 306 surrounding an internal fiber optic cable 308, a second section 304 where the internal fiber optic cable 308 breaks out from the jacket 306. In the fiber optic cable 300, there is a single internal fiber optic cable inside the jacket 306 that breakouts from the jacket 306.

The fiber optic cable 300 does not include a fan out arrangement for the internal fiber optic cable 308. The fiber optic cable 300 further includes a strength member 310 having a loop 312 that provides an anchor point for attaching the cable pulling sleeve 400 to the fiber optic cable 300. Also, the fiber optic cable 300 has a protective wrap 314 and a rip cord 318.

Figure 4:
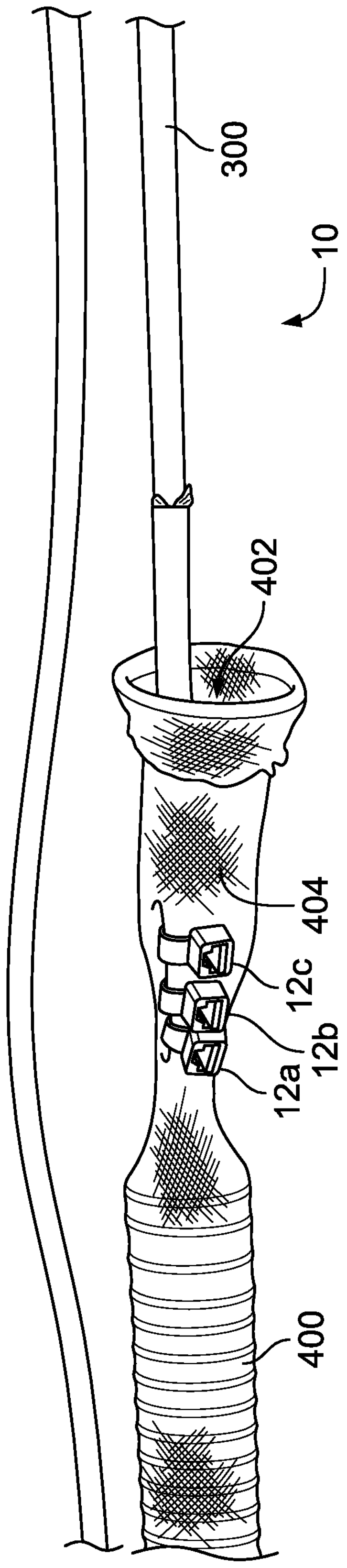
FIG. 4 shows an example of a fiber optic cable assembly that includes a cable pulling sleeve coupled to the fiber optic cable of FIG. 3.

FIG. 4 shows a fiber optic cable assembly 10 that includes the cable pulling sleeve 400 coupled to the fiber optic cable 300. In alternative examples, the fiber optic cable assembly 10 can include the cable pulling sleeve 400 coupled to the fiber optic cable 100 or 200. The cable pulling sleeve 400 defines a cavity 402 for enclosing the ends of the internal fiber optic cable(s).

The cable pulling sleeve 400 includes a mesh material that allows a lead end of a fastener 12 to pass through the cable pulling sleeve 400, thread through the loop 312 of the strength member 310, pass through the cable pulling sleeve 400, and to be fixed at a rear end to couple the cable pulling sleeve 400 to the fiber optic cable 300. In the example shown in the figure, the fastener 12 is a cable tie. In other examples, the fastener 12 can be a staple, ring, or other type of fixture for coupling the cable pulling sleeve 400 to the fiber optic cable 300.

In FIG. 4, two fasteners 12*a*, 12*b* (e.g., cable ties) are threaded through the cable pulling sleeve 400 and loop 312 of the strength member 310 for coupling the cable pulling sleeve 400 to the fiber optic cable 300. In other examples, more than two of the fasteners 12 can be threaded through the cable pulling sleeve 400 and loop 312 of the strength member 310 for coupling the cable pulling sleeve 400 to the fiber optic cable 300. In yet further examples, a single fastener can be threaded through the cable pulling sleeve 400 and loop 312 of the strength member 310 for coupling the cable pulling sleeve 400 to the fiber optic cable 300.

In FIG. 4, a third fastener 12*c* (e.g., cable tie) is tightened around a proximal end 404 of the cable pulling sleeve 400 for enclosing the cable pulling sleeve 400 around the ends of the internal fiber optic cables. Alternatively, tape can be wrapped around the proximal end 404 for enclosing the cable pulling sleeve 400 around the ends of the internal fiber optic cables.

Figure 5:
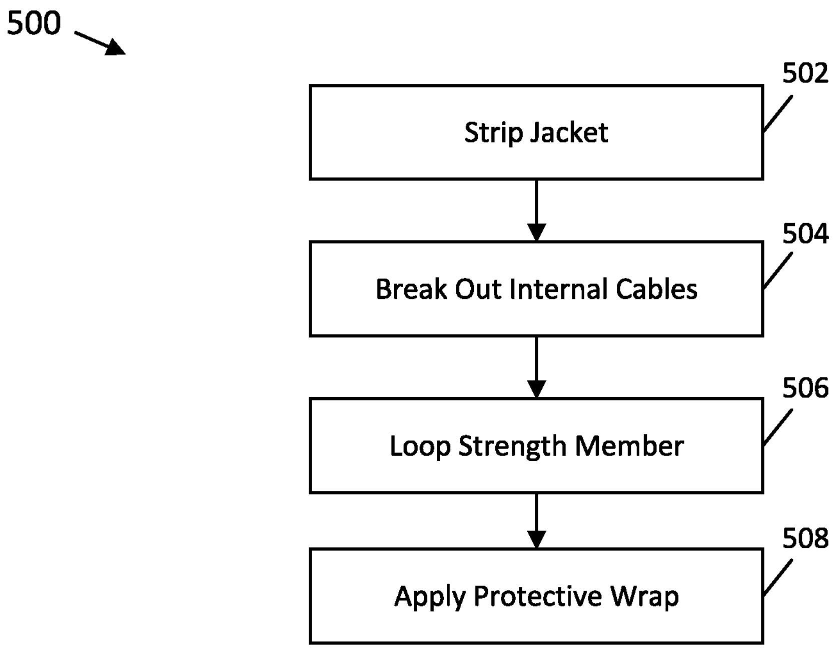
FIG. 5 illustrates an example of a method of preparing a fiber optic cable.

FIG. 5 illustrates an example of a method 500 of preparing a fiber optic cable. While the method 500 will described with reference to the fiber optic cable 100 shown in FIG. 1, the method 500 may also be used to prepare the fiber optic cables 200 and 300 shown in FIGS. 2-4. The method 500 includes an operation 502 of stripping the jacket 106 to expose the internal fiber optic cables 108 and strength member 110. The jacket 106 can be stripped using a cutting tool.

Next, the method 500 includes an operation 504 of breaking out the internal fiber optic cables 108 from the jacket 106. As described above, the fiber optic cable 100 does not include a fan out arrangement for the internal fiber optic cables 108.

Next, the method 500 includes an operation 506 of looping the strength member 110 to extend outside of the jacket 106. This forms the loop 112, which as described above, is used as an anchor point for coupling the cable pulling sleeve 400 to the fiber optic cable 100.

Thereafter, the method 500 includes an operation 508 of applying the protective wrap 114 to surround the strength member 110 where the strength member extends outside of the jacket 106. As described above, at least a portion of the strength member 110 is sandwiched between the jacket 106 and the protective wrap 114. Operation 508 can include applying heat to shrink the protective wrap 114 over the strength member 110 and the jacket 106.

Figure 30:
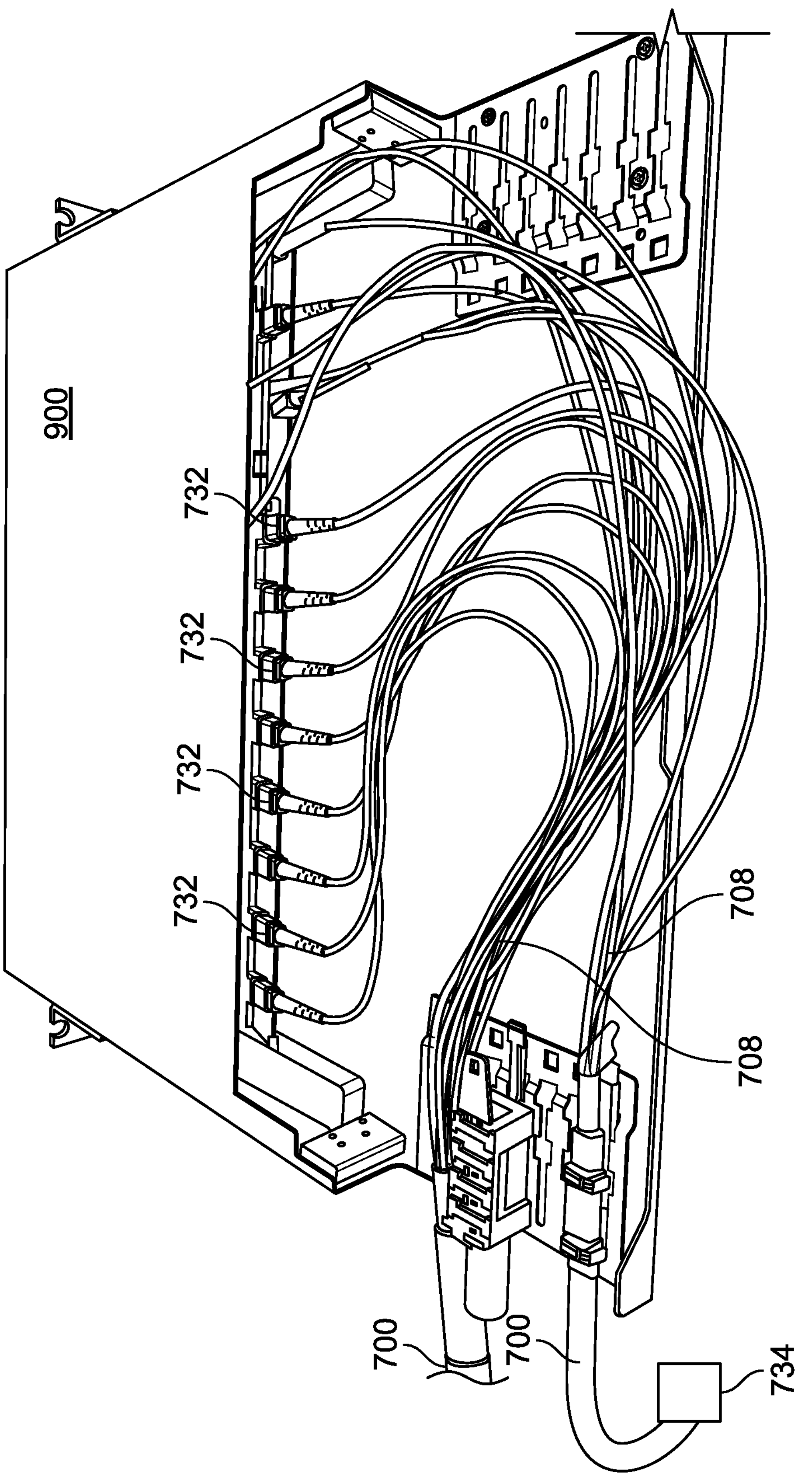
FIG. 30 shows an example of a fiber optic cable having ends of internal fiber optic cables plugged into telecommunications equipment.

The method 500 can include an operation of terminating the ends of the internal fiber optic cables 108 with a fiber optic connector, such as with the fiber optic connectors 732 shown in FIG. 30. The method 500 can also include an operation of terminating the fiber optic cable 100 with a fiber optic connector, such as with the fiber optic connector 734 shown in FIG. 30.

The method 500 can further include enclosing the ends of the internal fiber optic cables 108 inside the cable pulling sleeve 400, and threading at least one of the fasteners 12 (e.g., cable tie) through the cable pulling sleeve 400 and the loop 112 of the strength member 110 to couple the cable pulling sleeve 400 to the fiber optic cable 100. The method 500 can further include tightening the proximal end 404 of the cable pulling sleeve 400 to enclose the cable pulling sleeve 400 around the ends of the internal fiber optic cables 108. The proximal end 404 of the cable pulling sleeve can be tightened using a cable tie, tape, or other fastener.

Figure 6:
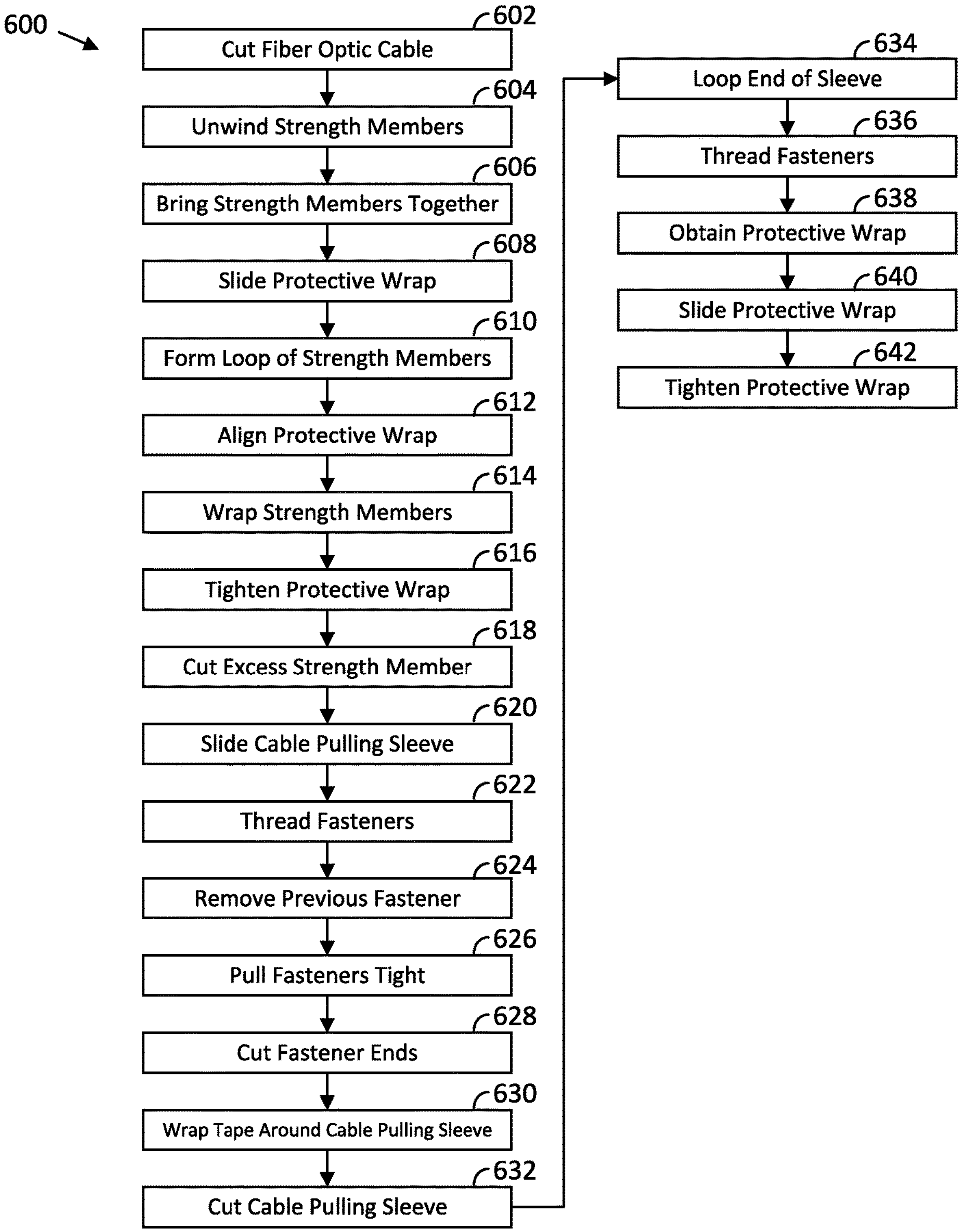
FIG. 6 illustrates an example of a method of assembling a fiber optic cable assembly.
Figure 7:
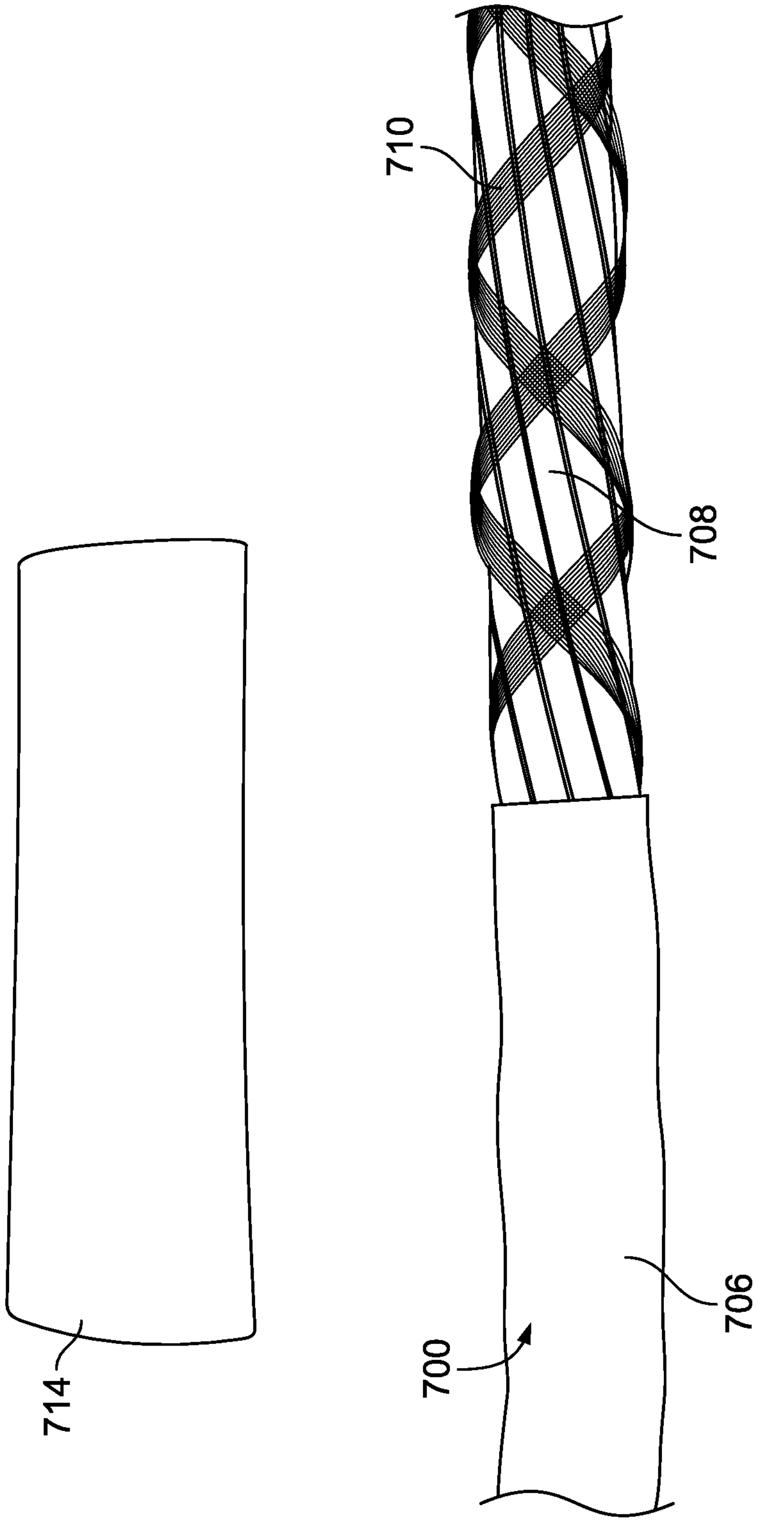
FIGS. 7-29 show examples of a fiber optic cable and a cable pulling sleeve during assembly of a fiber optic cable assembly in accordance with the method of FIG. 6.

FIG. 6 illustrates an example of a method 600 of assembling a fiber optic cable assembly 20. The method 600 includes an operation 602 of cutting a fiber optic cable 700 to remove a portion of a jacket 706 to expose internal fiber optic cables 708 and strength members 710. The fiber optic cable 700 after completion of operation 602 is shown in FIG. 7.

Figure 8:
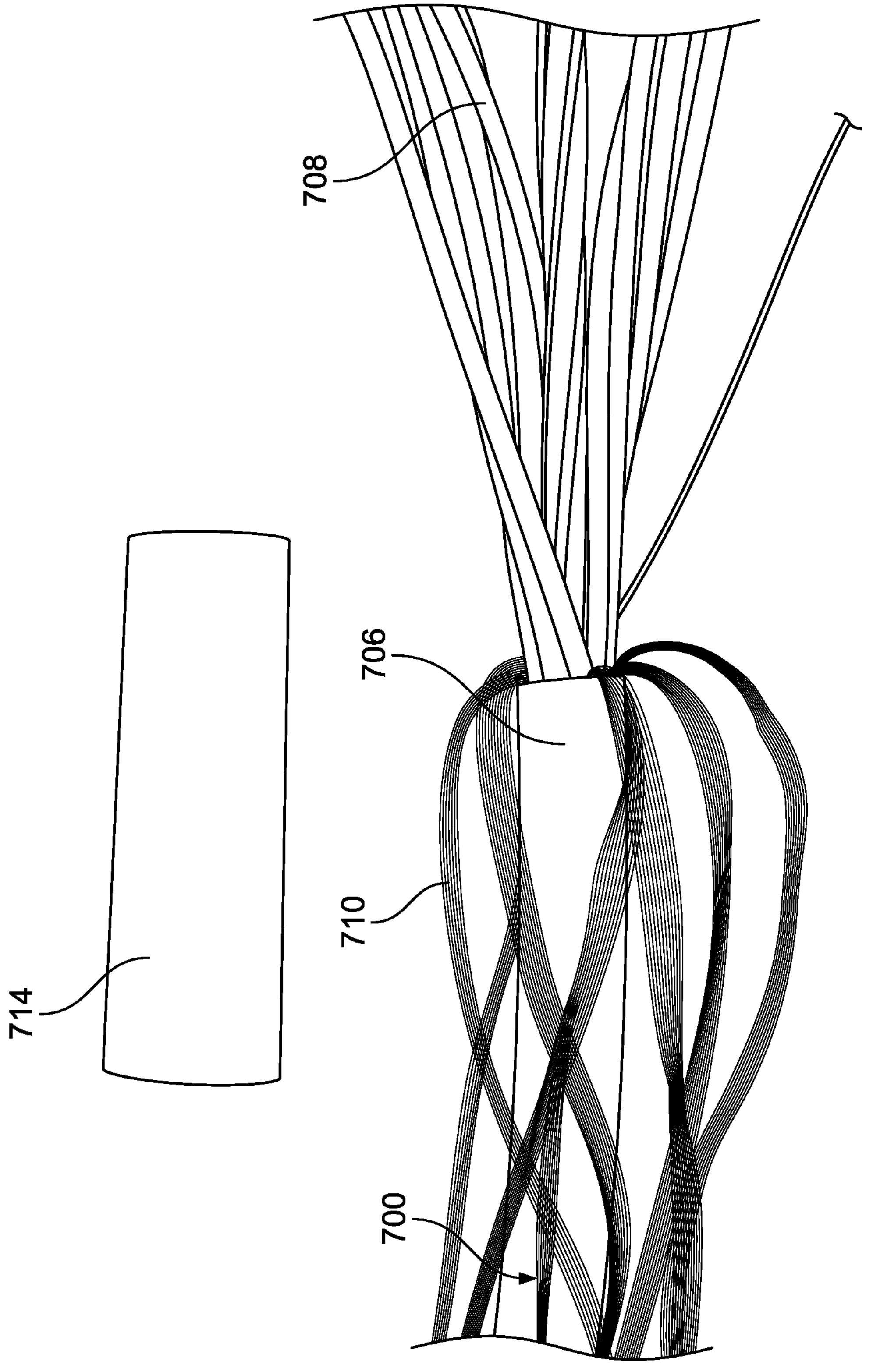

Next, the method 600 includes an operation 604 of unwinding the strength members 710 and pulling the strength members 710 back over the cut edge of the jacket 706. The fiber optic cable 700 after completion of operation 604 is shown in FIG. 8.

Figure 9:
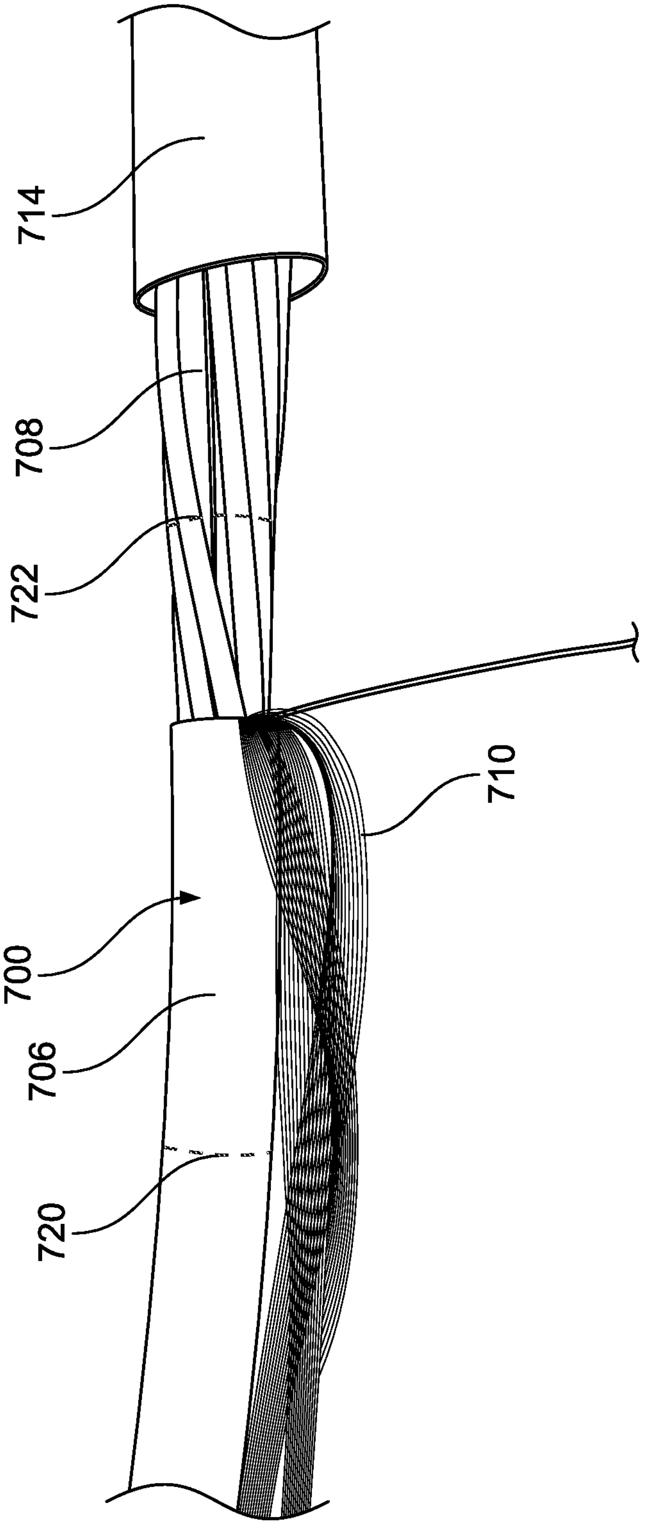

Next, the method 600 includes an operation 606 of bringing all of the strength members 710 together. Operation 606 can also include markings 720, 722 for aligning the protective wrap 714. In the example shown in FIG. 7, the protective wrap 714 is about 3 inches long, and is positioned to be about 2 inches overlapping the jacket 706, and having about 1 inch extending beyond the cut edge of the jacket 706 and overlapping the internal fiber optic cables 708. The fiber optic cable 700 after completion of operation 606 is shown in FIG. 9.

Figure 10:
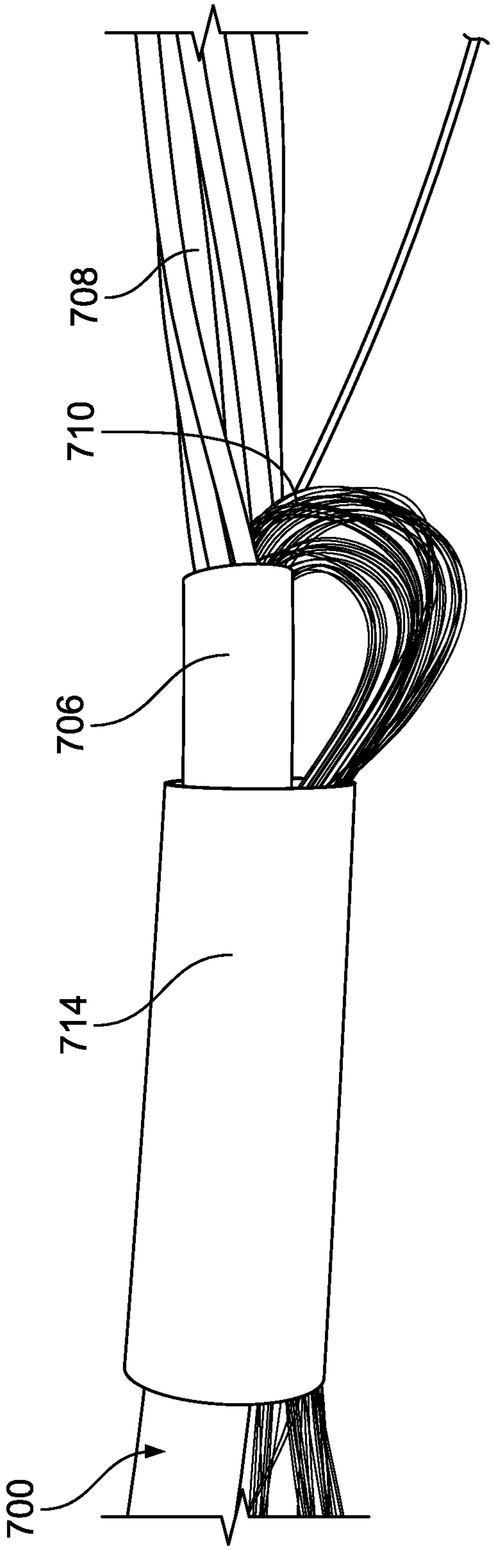

Next, the method 600 includes an operation 608 of sliding the protective wrap 714 over the internal fiber optic cables 708, the jacket 706, and the strength members 710. The fiber optic cable 700 after completion of operation 608 is shown in FIG. 10.

Next, the method 600 includes an operation 610 of forming a loop 712 of the strength members 710. In the example shown in FIG. 11, a fastener 12 (e.g., cable tie) is used to form the loop 712. A lead end of the fastener 12 is threaded through the strength members 710, and the lead end of the fastener 12 is secured to a connector 14 on a rear end of the fastener 12 to link or chain the fastener 12 to the strength members 710. The fastener 12 can be used to pull the strength members 710 to form the loop 712 to have an appropriate size and shape, manage the loop 712 to maintain the size and shape of the loop 712, and prevent the loop 712 from fraying.

Alternatively, or in addition to using the fastener 12 to form and maintain the shape of the loop 712, an adhesive can be applied to the strength members 710 to form the loop 712. In some examples, the adhesive is a glue stick that can be threaded through the strength members 710 to bundle the strength members 710 together to form and maintain the loop 712.

Figure 12:
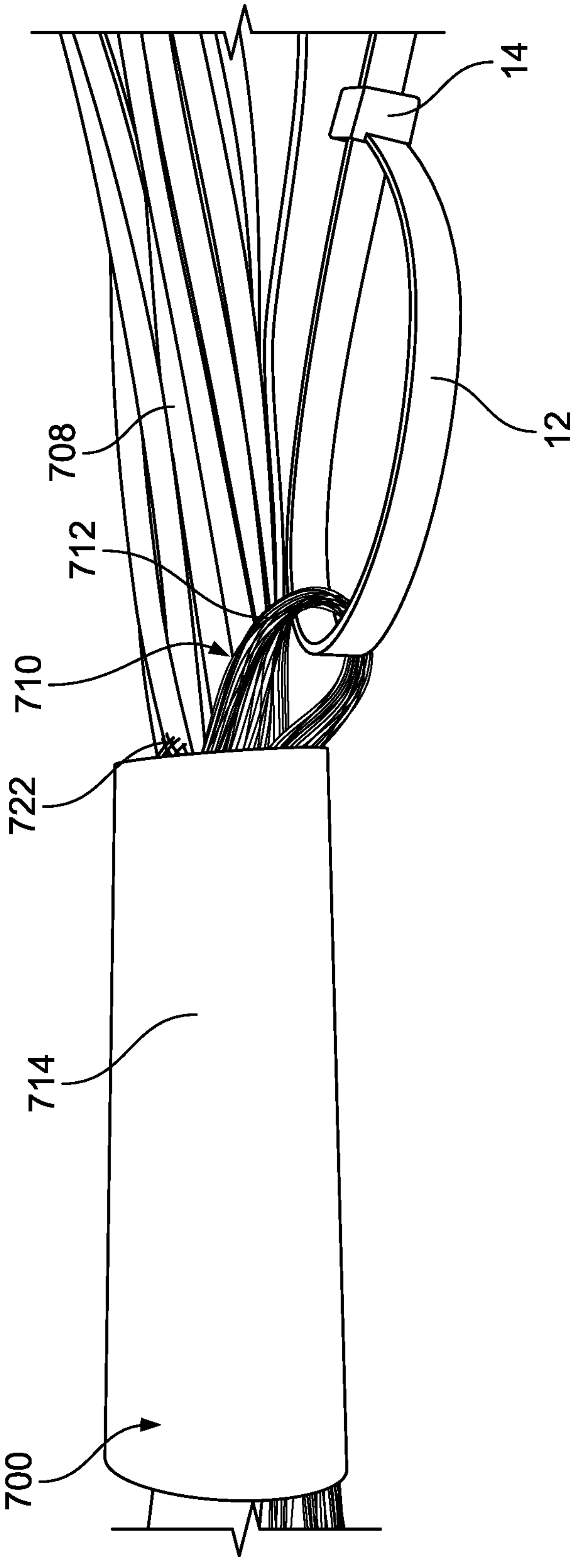

Next, the method 600 includes an operation 612 of aligning the protective wrap 714 with the markings 720, 722 made in operation 606, and using the fastener 12 to move the strength members 710 to shape and size the loop 712. In some examples, the loop 712 is shaped and sized to have a diameter of about 0.75 inches with a tolerance of about 0.25 inches. The fiber optic cable 700 after completion of operation 612 is shown in FIG. 12.

Figure 13:
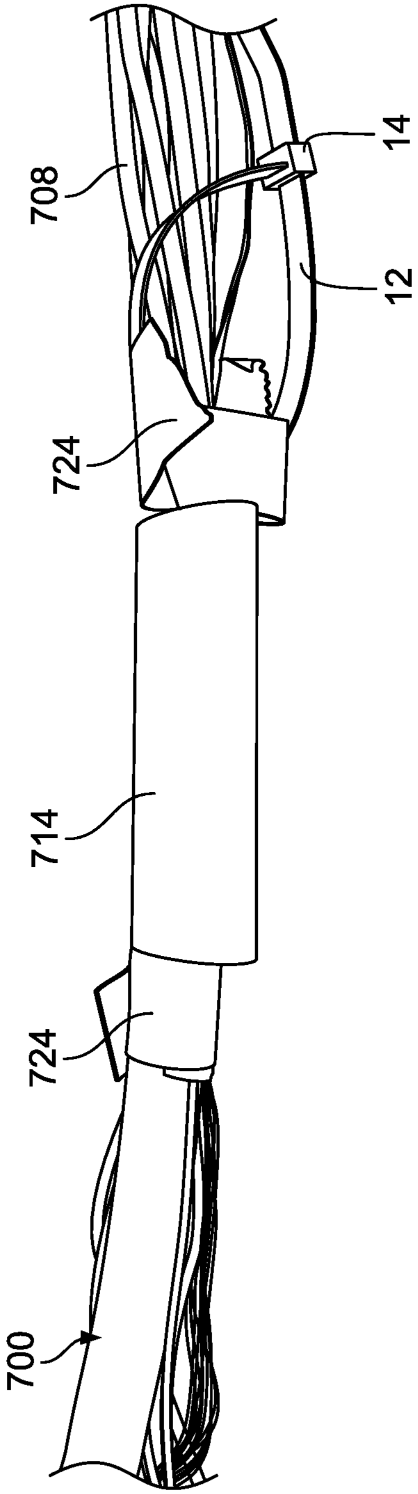

Next, the method 600 includes an operation 614 of wrapping the strength members 710 with a removable protective layer 724. In some examples, the removable protective layer 724 is masking tape. The removable protective layer 724 is designed to protect the strength members 710 from heat when the heat is applied to the protective wrap 714 to shrink and tighten the protective wrap around the jacket 706, internal fiber optic cables 708, and strength members 710. The fiber optic cable 700 after completion of operation 614 is shown in FIG. 13.

Figure 14:
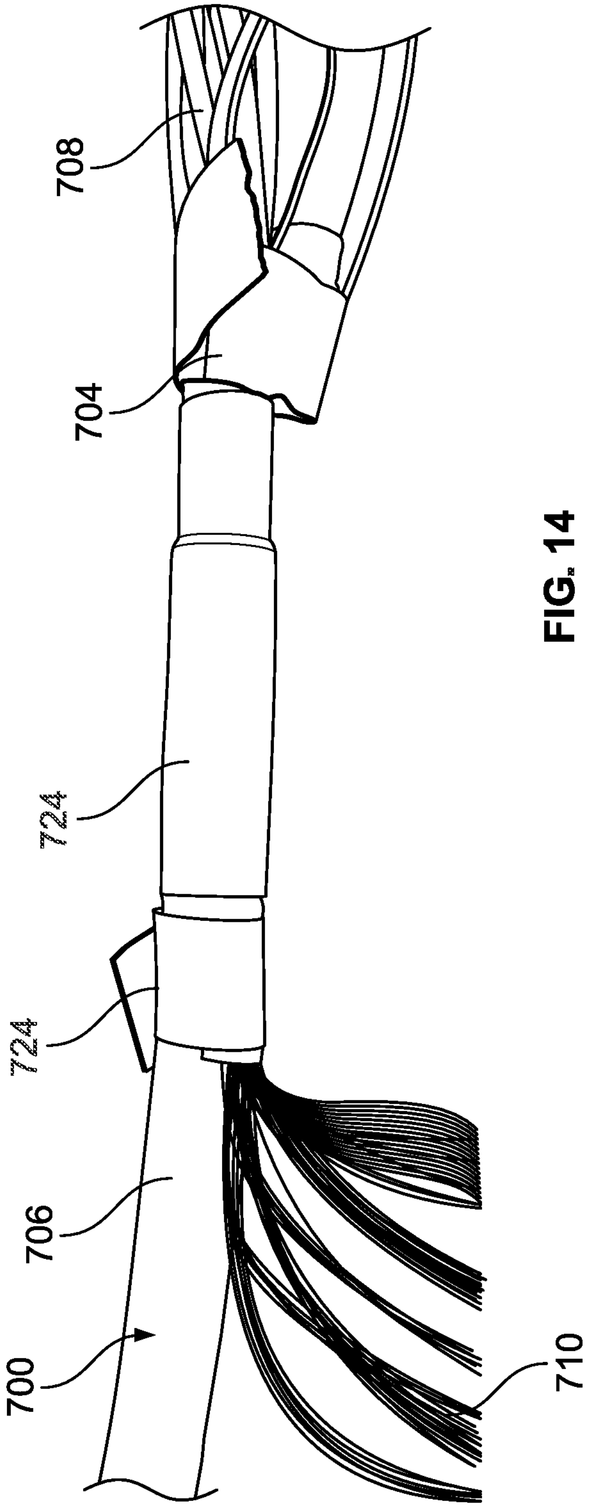

Next, the method 600 includes an operation 616 of tightening the protective wrap 714 around the jacket 706, internal fiber optic cables 708, and strength members 710. In examples where the protective wrap 714 includes a heat shrink wrap, operation 616 includes applying heat to shrink the protective wrap 714 around the jacket, internal fiber optic cables, and strength members. The fiber optic cable 700 after completion of operation 616 is shown in FIG. 14.

Figure 15:
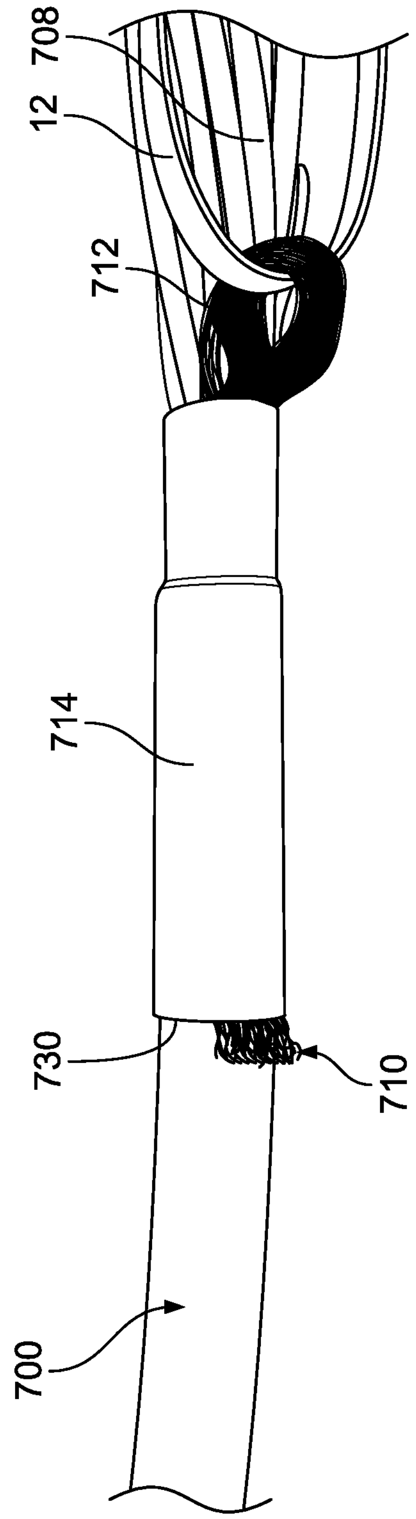

Next, the method 600 includes an operation 618 of cutting excess of the strength members 710 at the back end 730 of the protective wrap 714, removing the removable protective layer 724, and cleaning up the markings 720, 722 where necessary. After completion of operation 618, the fiber optic cable 700 is prepared and ready for attachment to a cable pulling sleeve. The fiber optic cable 700 after completion of operation 618 is shown in FIG. 15.

Figure 16:
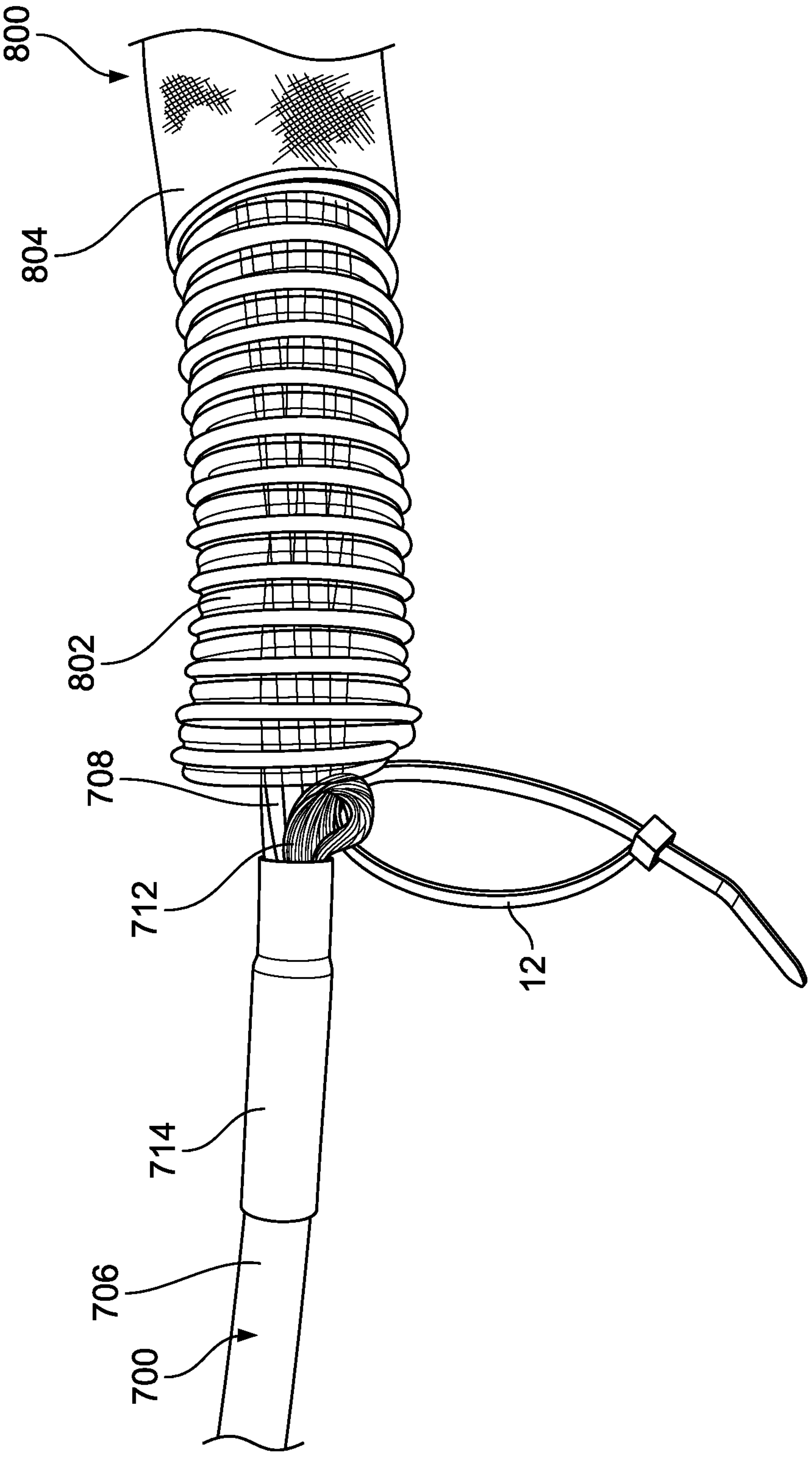
Figure 17:
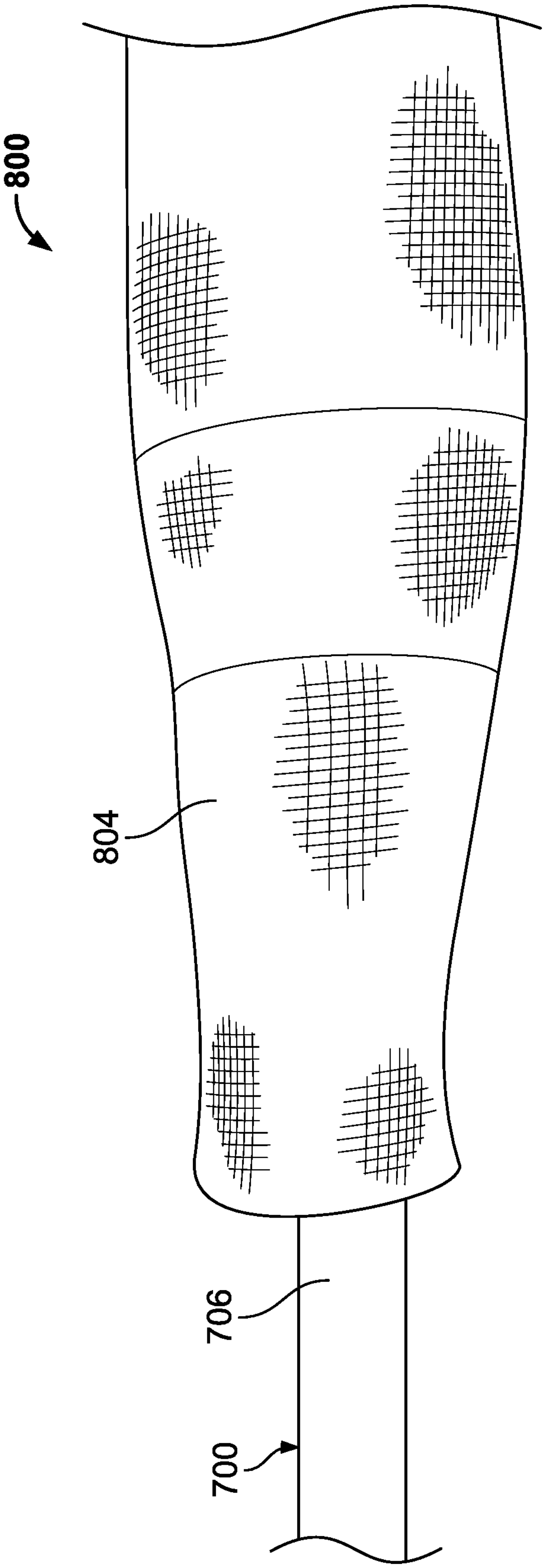

Next, the method 600 includes an operation 620 of sliding a cable pulling sleeve 800 over the internal fiber optic cables 708, the loop 712 of the strength members 710, and the jacket 706. In some examples, the cable pulling sleeve 800 includes a slide tube portion 802 (shown in FIG. 16) which is pulled up the internal fiber optic cables 708 until it reaches the loop 712 on the fiber optic cable 700, as shown in FIG. 16. Operation 620 includes pulling a meshed sleeve portion 804 of the cable pulling sleeve 800 over the slide tube portion 802 until it is even to the back of the protective wrap 714, as shown in FIG. 17.

Figure 18:
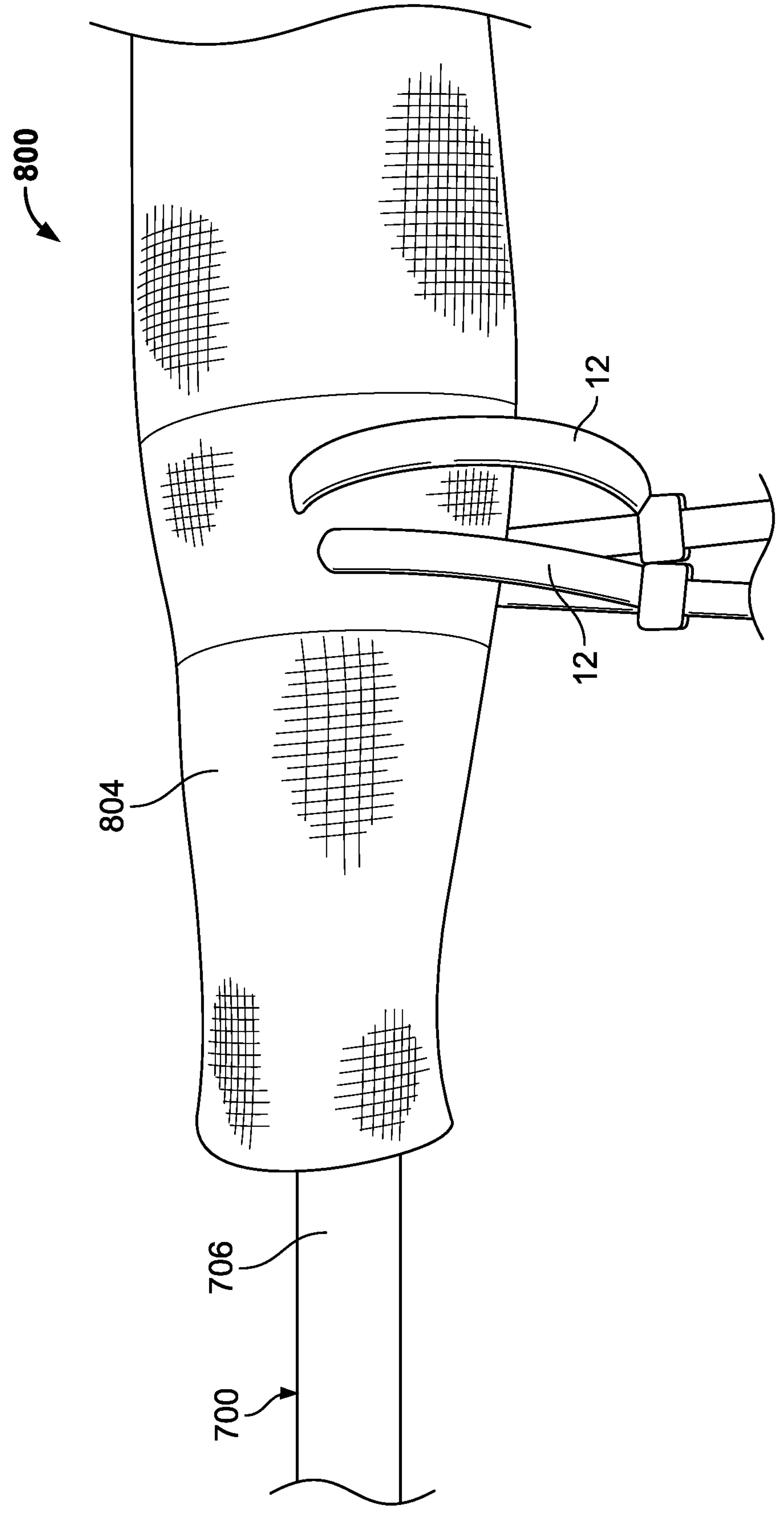

Next, the method 600 includes an operation 622 of threading at least one fastener through the meshed sleeve portion 804 of the cable pulling sleeve 800 and the loop 712 on the fiber optic cable 700. In some examples, operation 622 includes threading at least two fasteners through the cable pulling sleeve 800 and the loop 712 on the fiber optic cable 700. The fiber optic cable 700 after completion of operation 622 is shown in FIG. 18.

Figure 11:
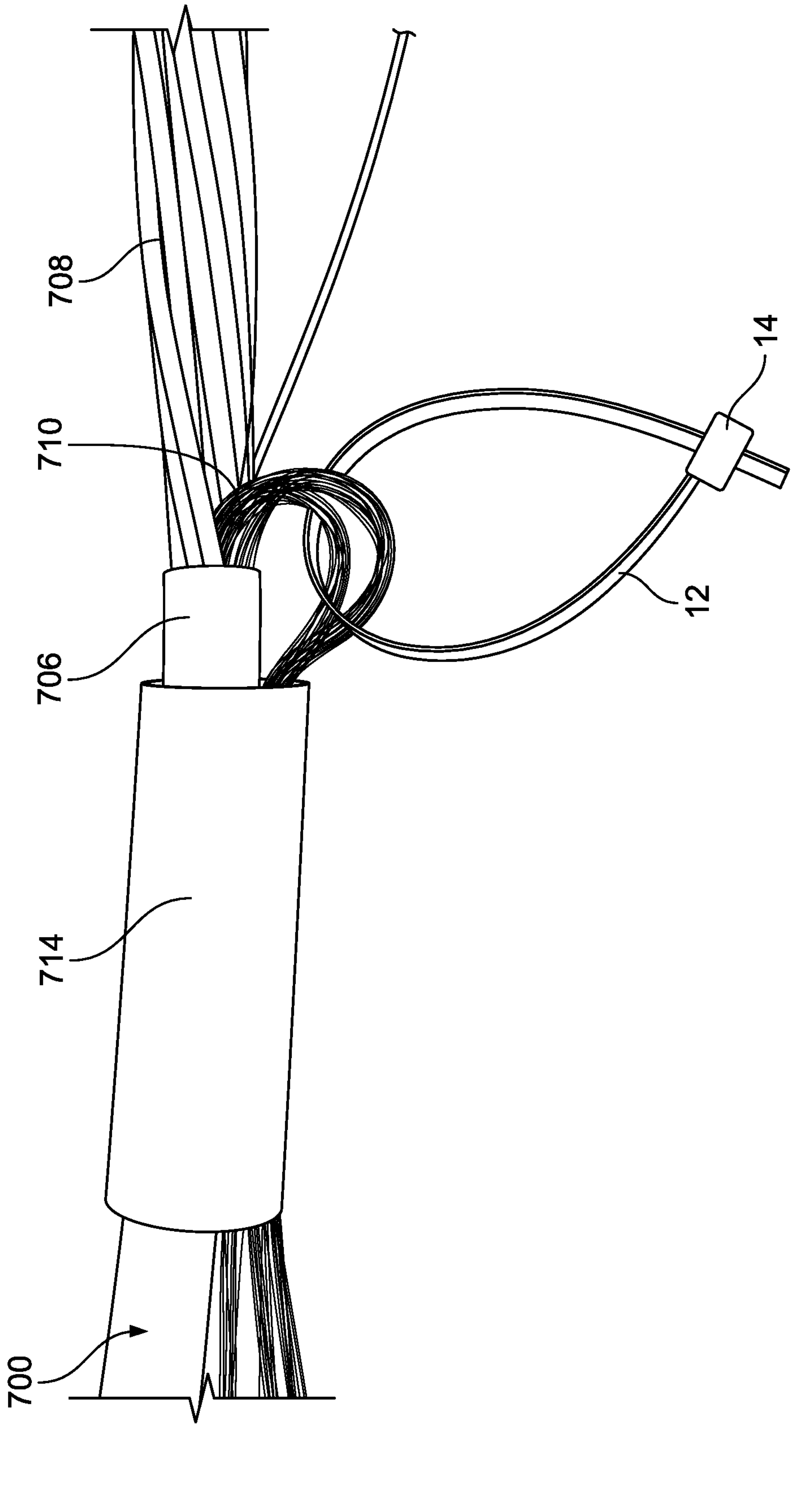
Figure 19:
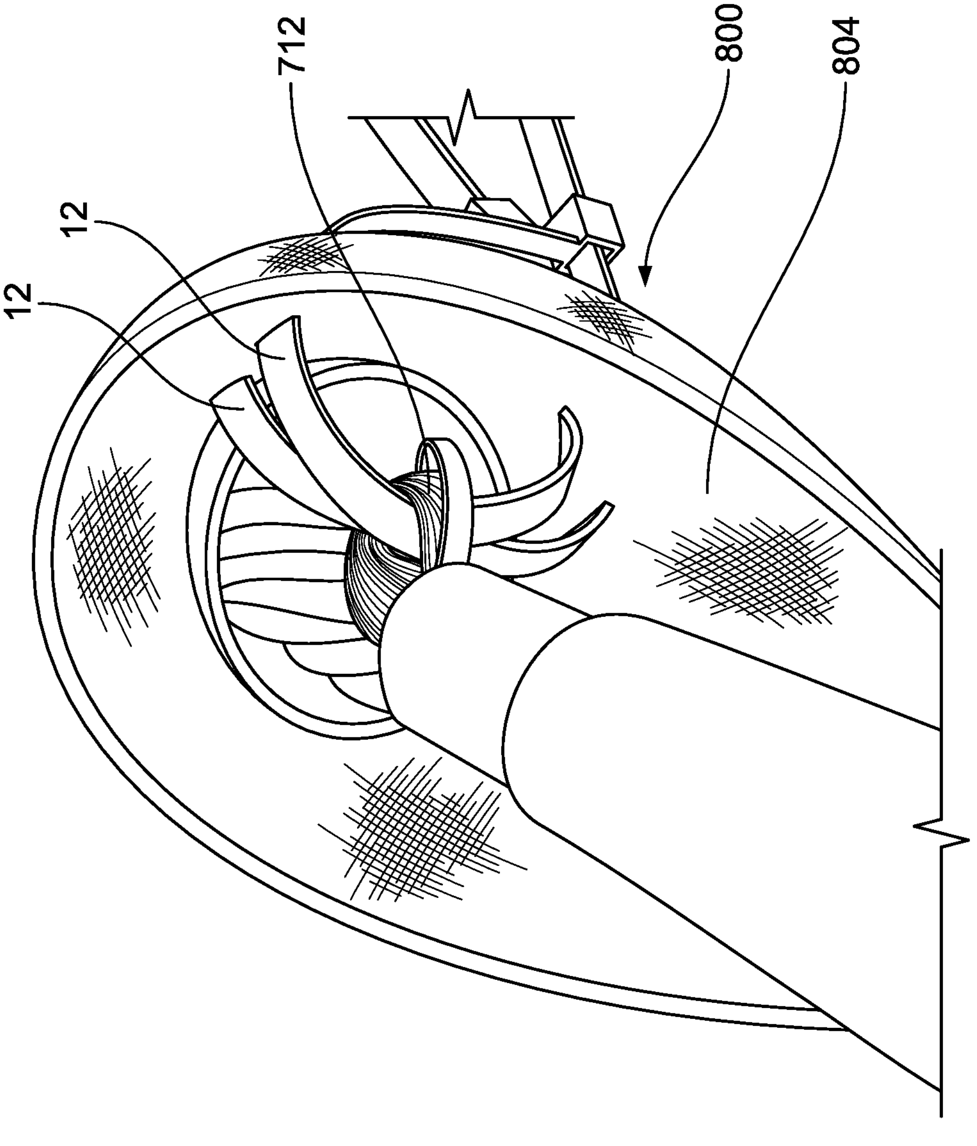

Next, the method 600 includes an operation 624 of removing the fastener 12 that was previously looped through the loop 712 in operation 610 and shown in FIG. 11. Operation 624 can further include verifying that the one or more fasteners 12 that were threaded in operation 622 are indeed looped through the loop 712 and the cable pulling sleeve 800. The fiber optic cable 700 after completion of operation 624 is shown in FIG. 19.

Figure 20:
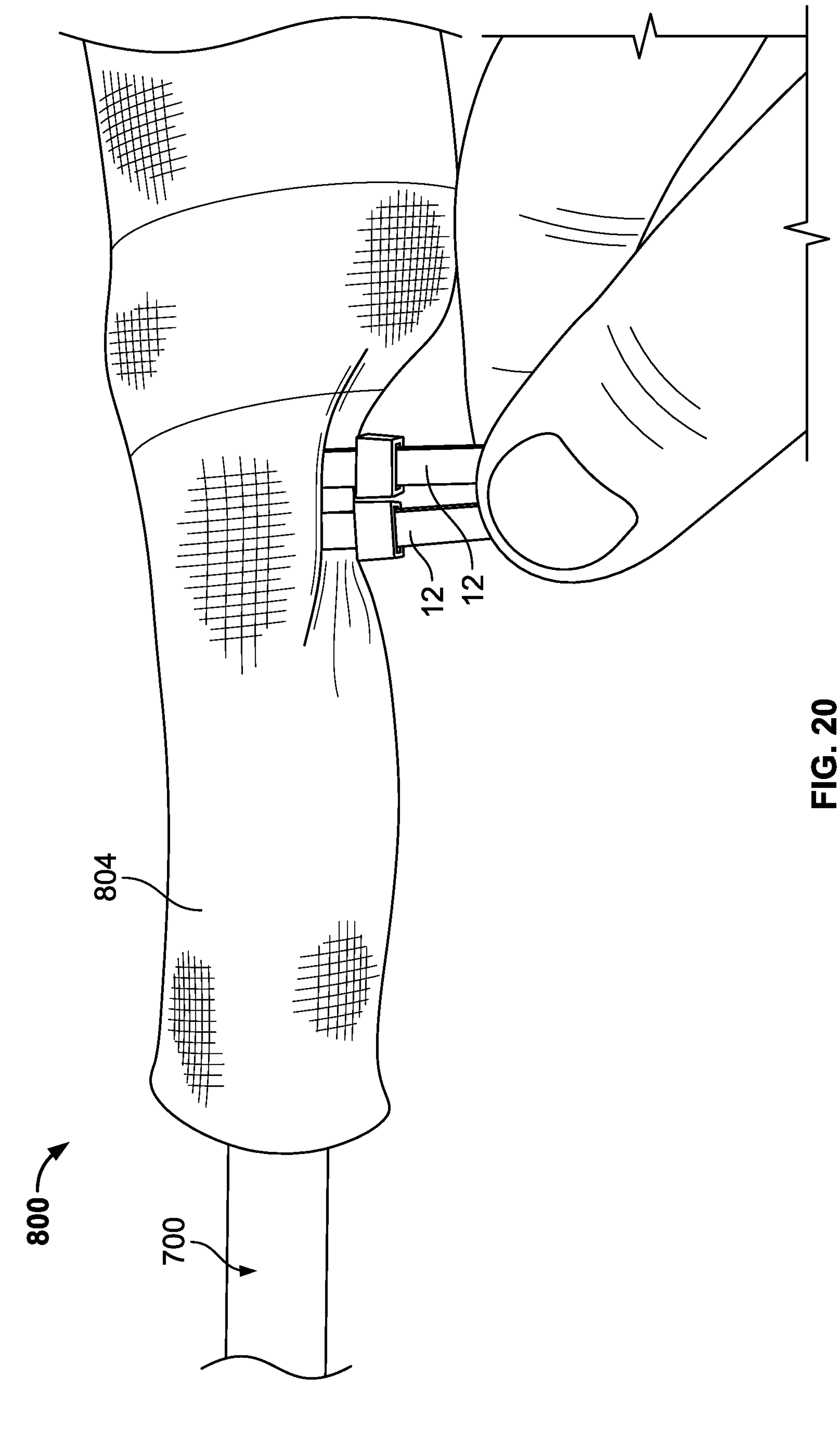

Next, the method 600 includes an operation 626 of pulling the fasteners 12 tight to secure the cable pulling sleeve 800 to the fiber optic cable 700. The fiber optic cable 700 and the cable pulling sleeve 800 after completion of operation 626 are shown in FIG. 20.

Figure 21:
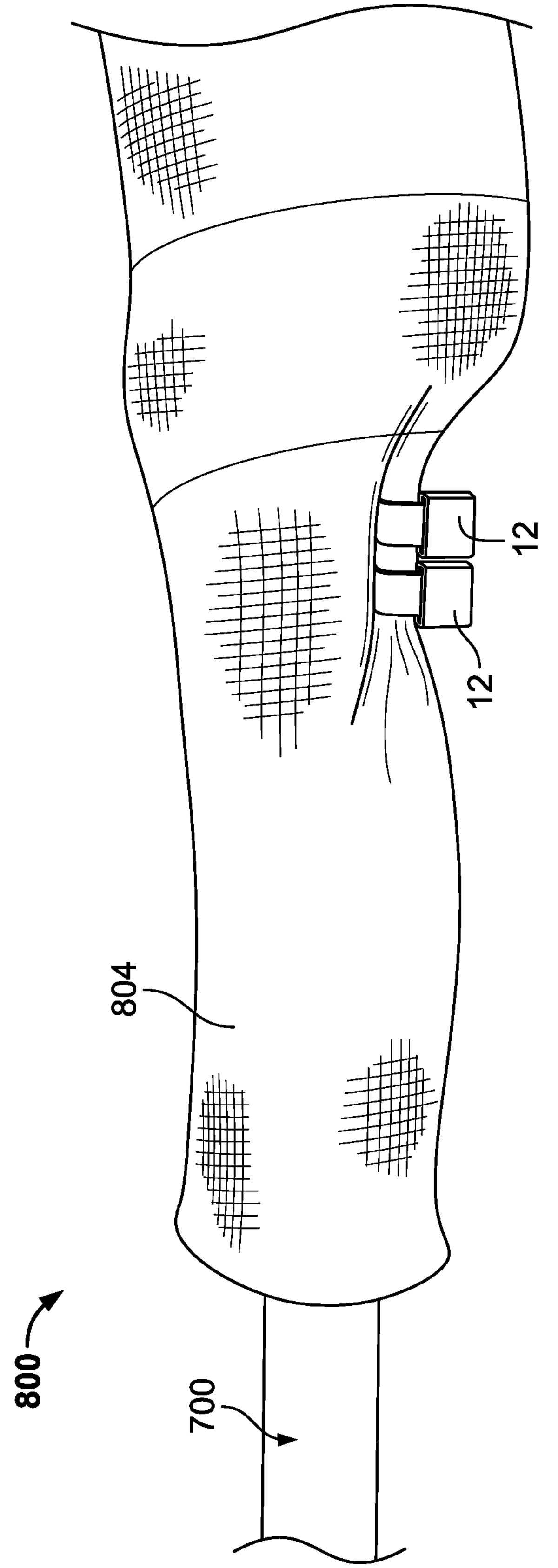

Next, the method 600 includes an operation 628 of cutting the ends of the fasteners 12. The fiber optic cable 700 after completion of operation 628 is shown in FIG. 21.

Figure 22:
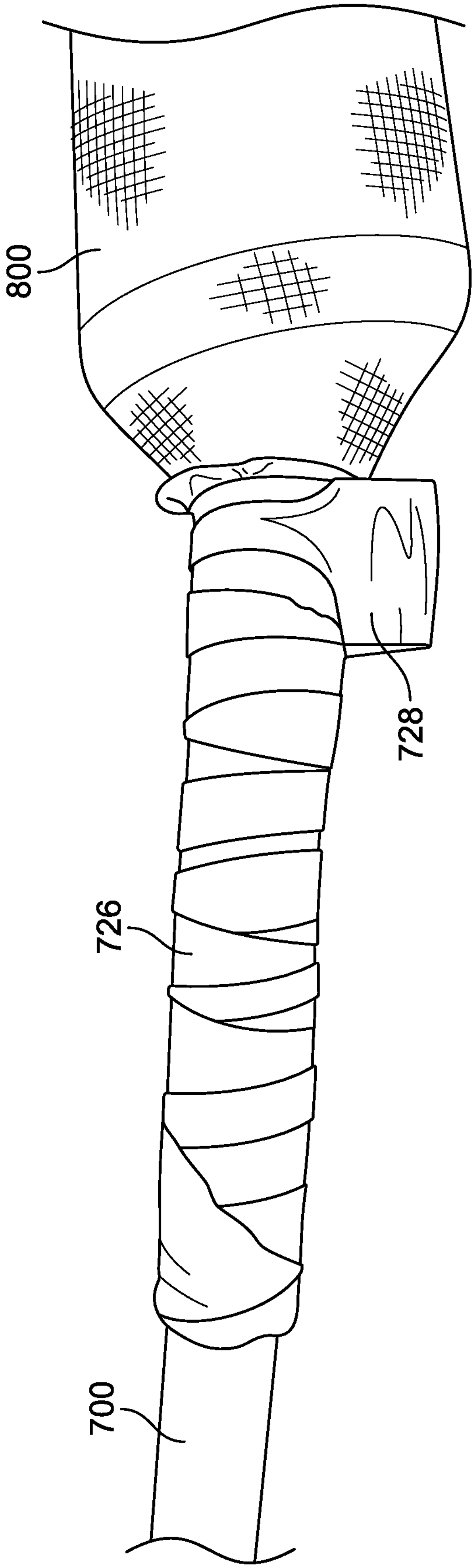

Next, the method 600 includes an operation 630 of wrapping the jacket 706, cable pulling sleeve 800, and fasteners 12 with tape 726. In some examples, operation 630 can include adding a tab 728 to the tape 726 for ease of removal of the tape 726 once the fiber optic cable 700 is installed. The fiber optic cable 700 after completion of operation 630 is shown in FIG. 22.

Figure 23:
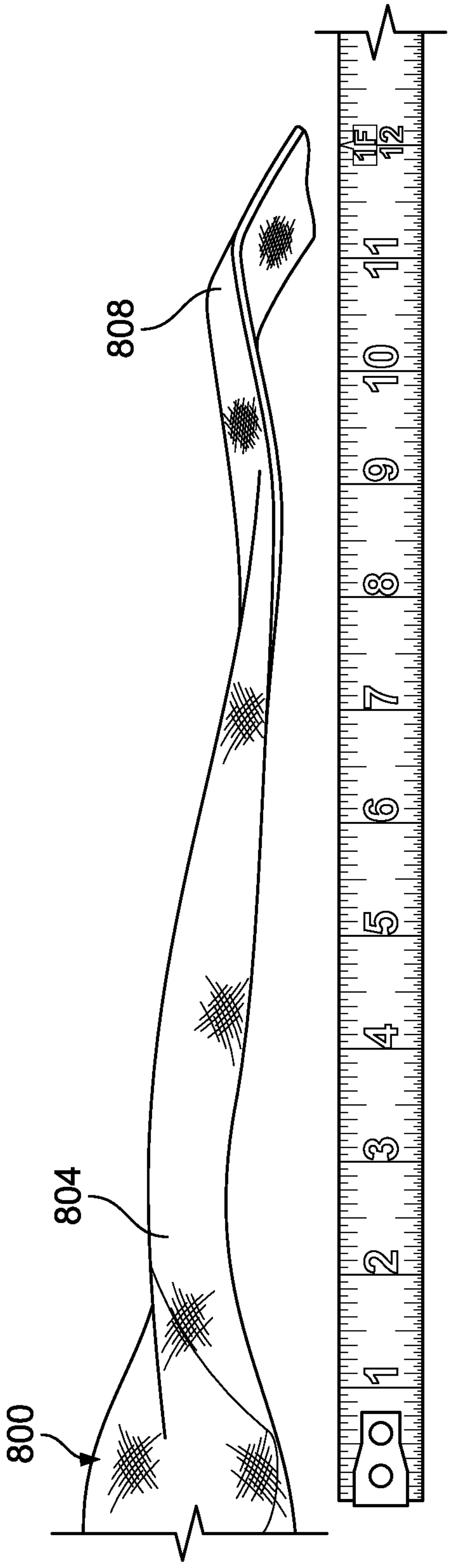

Next, the method 600 includes an operation 632 of cutting a distal end 808 of the meshed sleeve portion 804. In some examples, the distal end 808 of the meshed sleeve portion 804 is cut about 12 inches (tolerance of +/−1 inch) from the end of the slide tube portion 802. The cable pulling sleeve 800 after completion of operation 632 is shown in FIG. 23.

Figure 24:
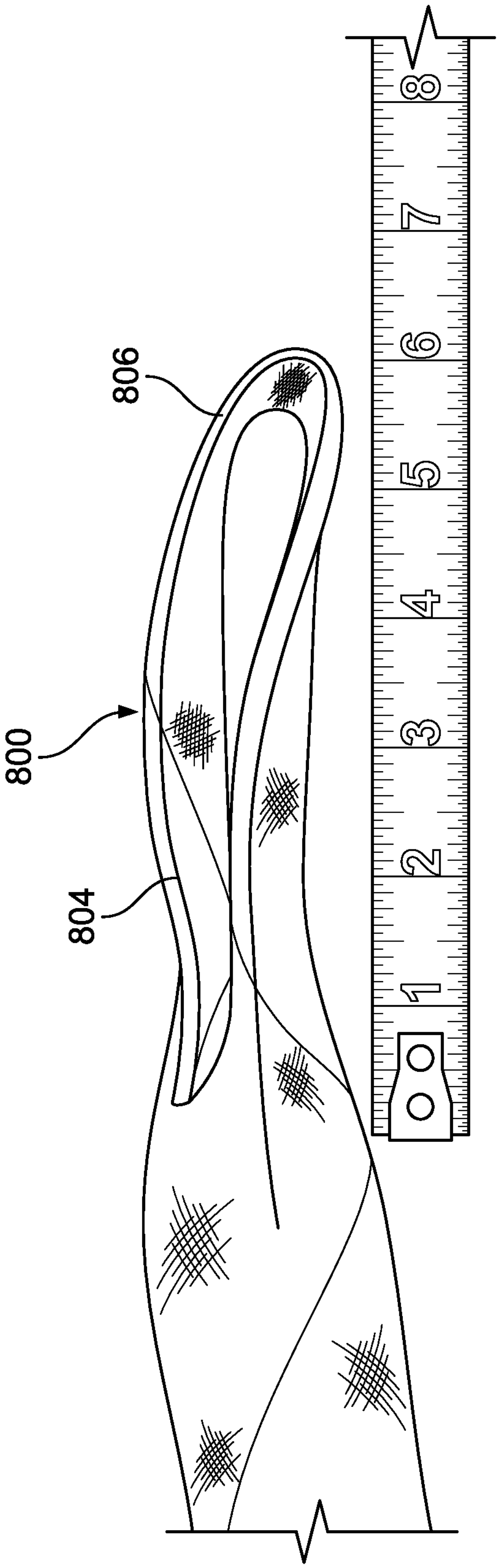

Next, the method 600 includes an operation 634 of looping the end of the meshed sleeve portion 804 to shape a loop 806. In some examples, the loop 806 is shaped to have a diameter of about 6 inches, with a tolerance of +/−1 inch. The cable pulling sleeve 800 after completion of operation 634 is shown in FIG. 24.

Figure 25:
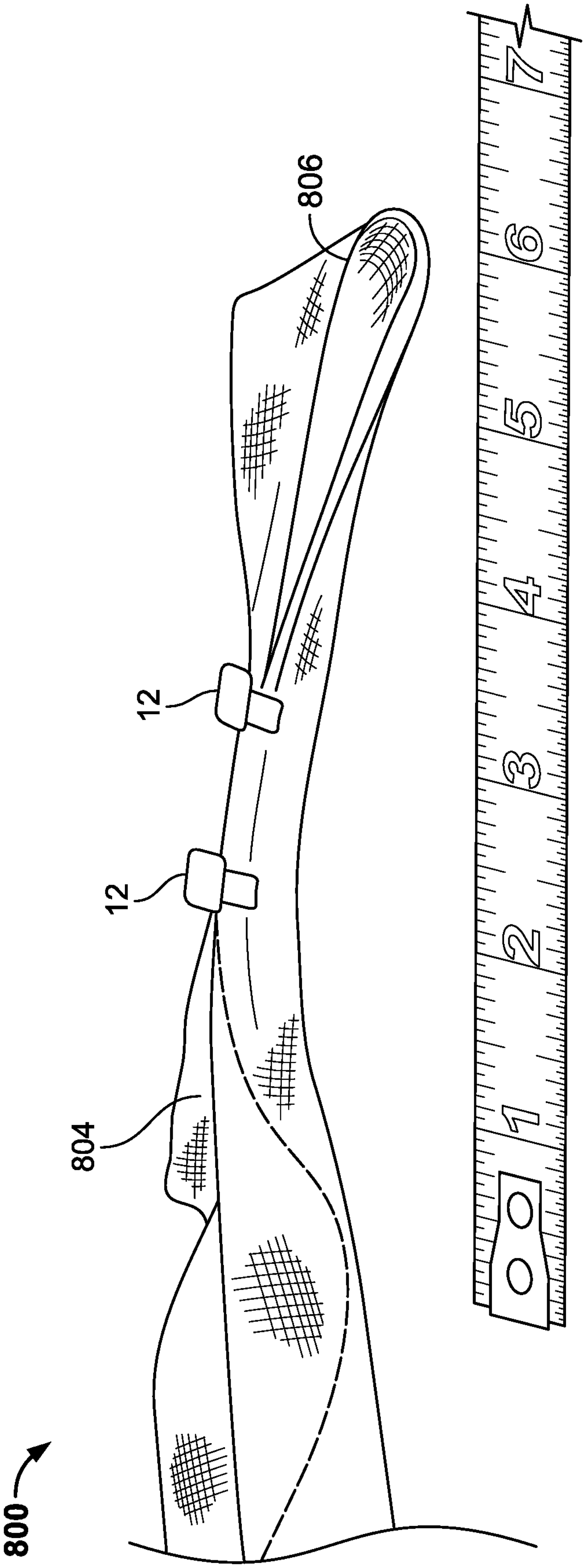

Next, the method 600 includes an operation 636 of threading one or more fasteners 12 through the meshed sleeve portion 804 to fix the loop 806. In some examples, operation 636 includes threading two or more fasteners 12 to fix the loop 806. In some examples, operation 636 further includes cutting the ends of the fasteners 12 after tightening. The meshed sleeve portion 804 after completion of operation 636 is shown in FIG. 25.

Figure 26:
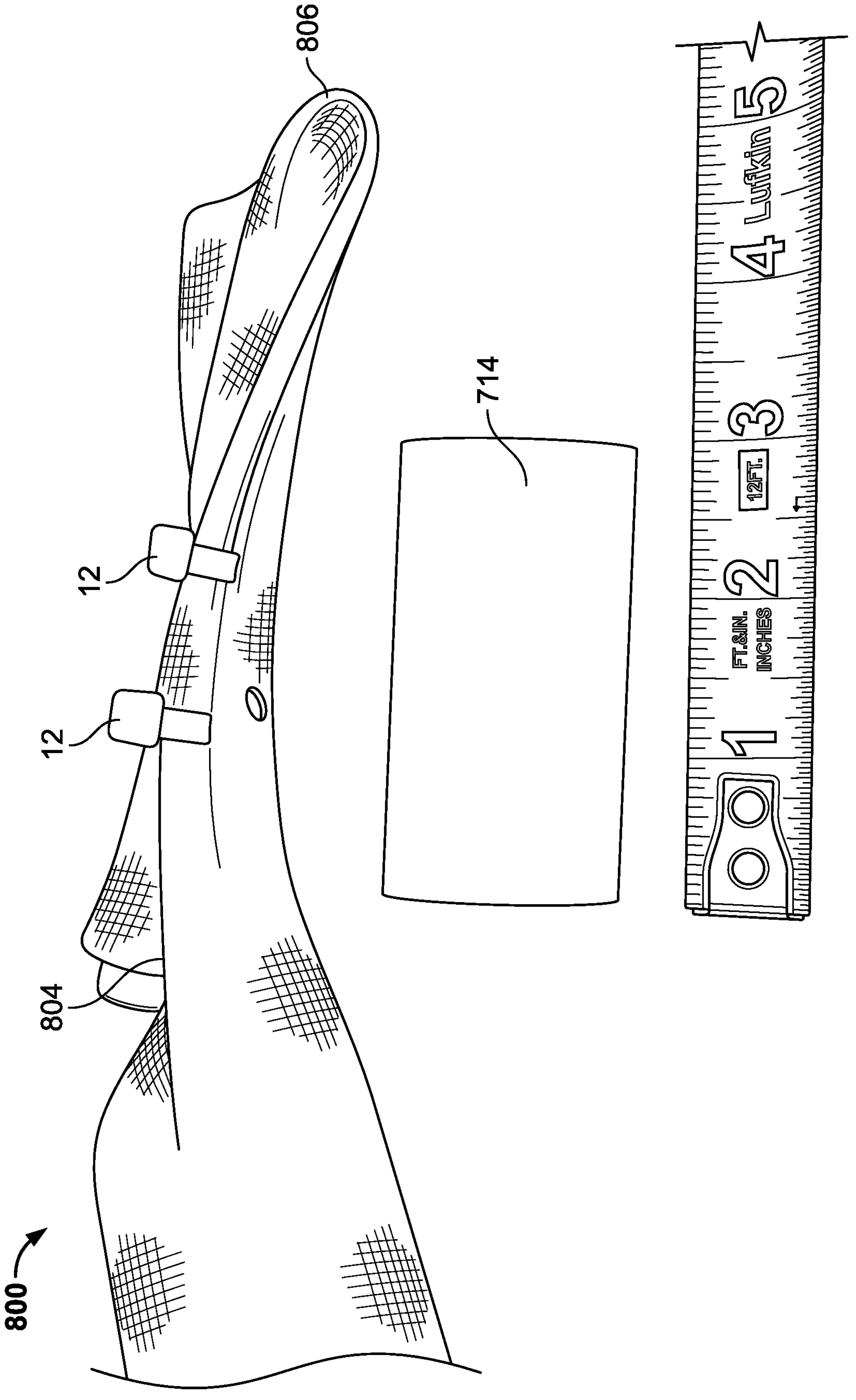

Next, the method 600 includes an operation 638 of obtaining a protective wrap 714. The protective wrap 714 is cut to be about 3 inches long with a tolerance of +/−0.5 inches. The protective wrap 714 and meshed sleeve portion 804 are shown in FIG. 26.

Figure 27:
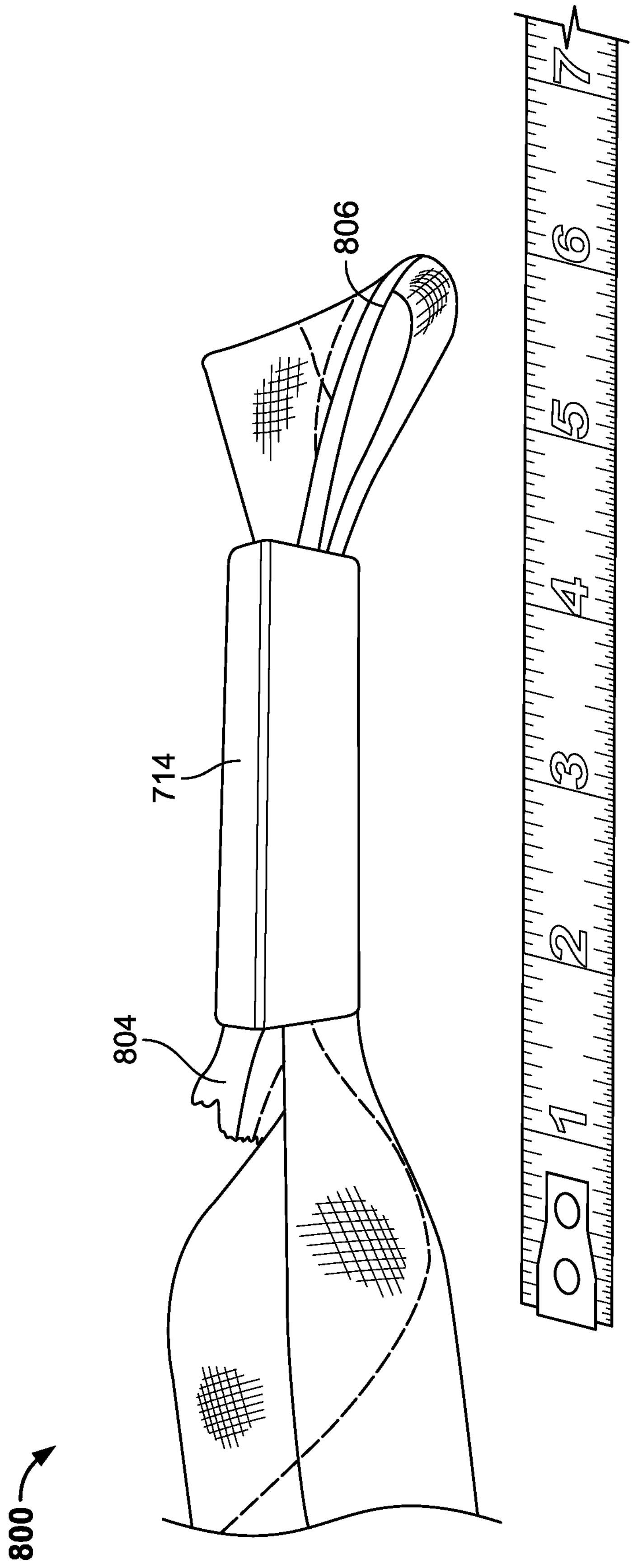

Next, the method 600 includes an operation 640 of sliding the protective wrap 714 over the meshed sleeve portion 804 and the fasteners 12 that were threaded through the meshed sleeve portion 804 for fixing the loop 806 in operation 636. The protective wrap 714 can be centered over the fasteners 12. The protective wrap 714 and meshed sleeve portion 804 after completion of operation 640 are shown in FIG. 27.

Figure 28:
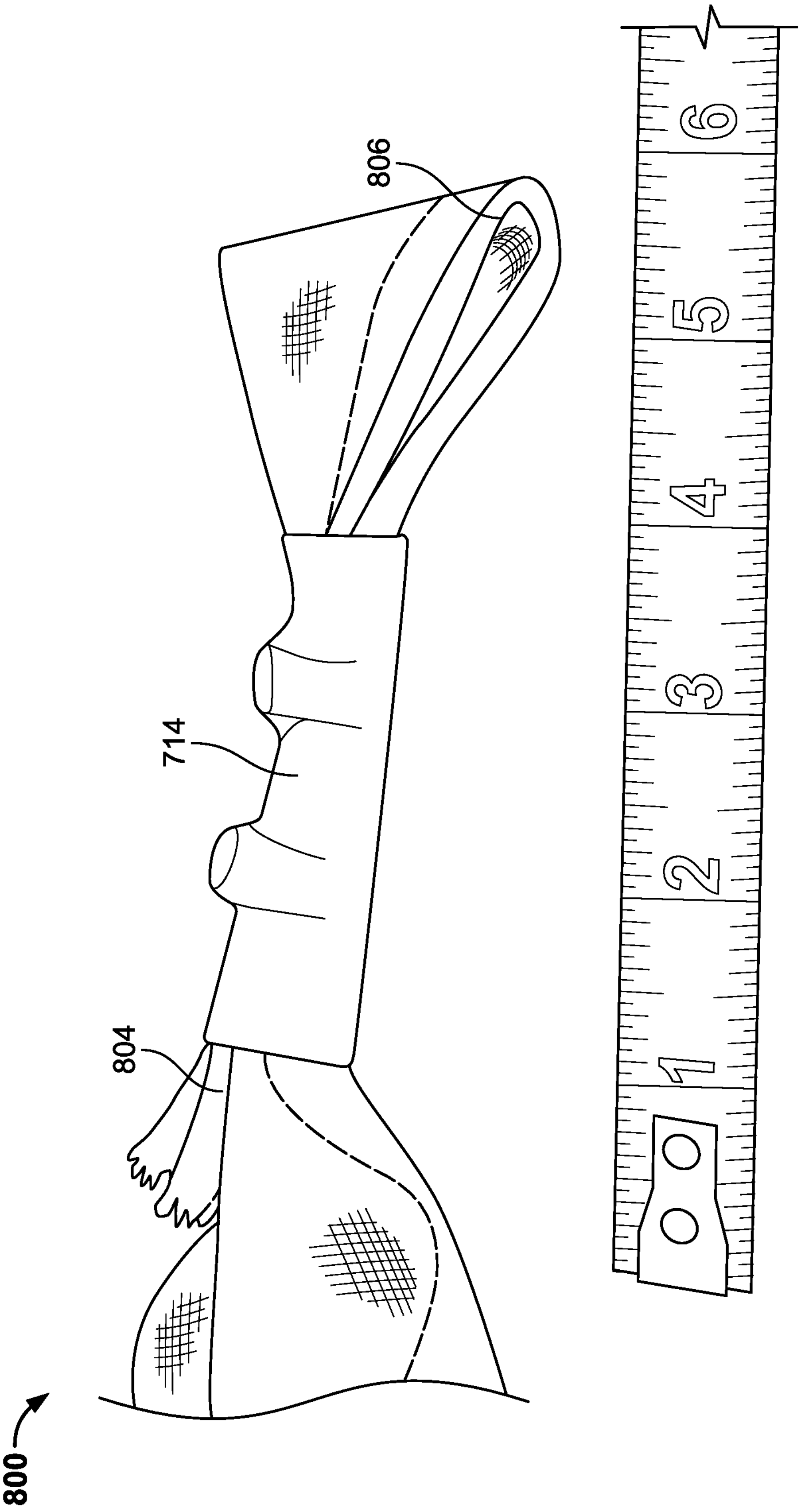

Next, the method 600 includes an operation 642 of tightening the protective wrap 714 over the meshed sleeve portion 804 and the fasteners 12. In examples where the protective wrap 714 includes a heat shrink wrap, operation 642 includes applying heat to shrink the protective wrap 714 around the meshed sleeve portion 804 and the fasteners 12. The protective wrap 714 and meshed sleeve portion 804 after completion of operation 642 is shown in FIG. 28.

Figure 29:
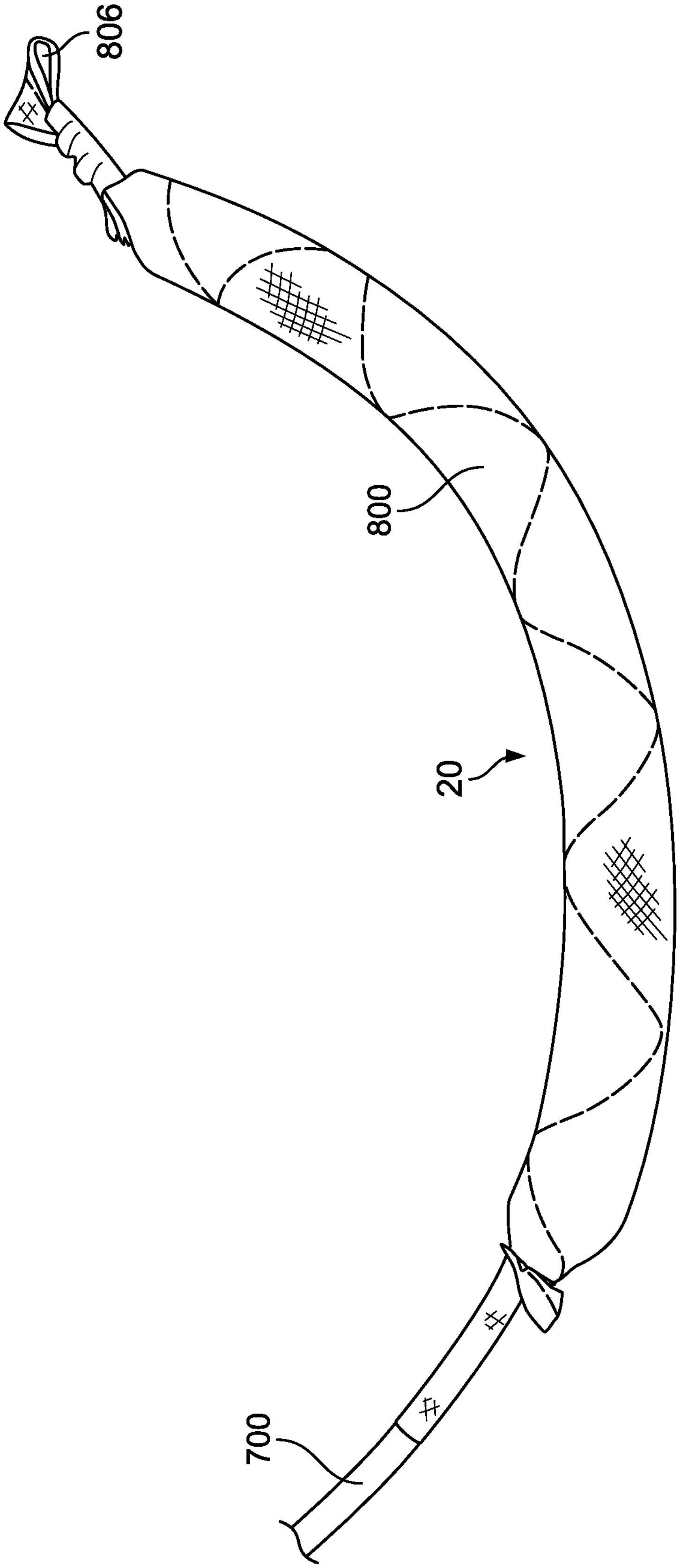

FIG. 29 shows the fiber optic cable assembly 20 assembled after completion of the method 600. As shown in FIG. 29, the ends of the internal fiber optic cables 708 are enclosed inside the cable pulling sleeve 800, which can be used to pull the fiber optic cable 700 through a conduit. For example, a rope (not shown) can be attached to the loop 806 for pulling the fiber optic cable 700 through a conduit or enclosed space such as aerial tracks, underground pipes, support structures disposed inside walls, and the like without causing damage to the fiber optic cable 700, the internal fiber optic cables 708, or the ends thereof.

FIG. 30 shows examples of fiber optic cables 700 having the ends of the internal fiber optic cables 708 plugged into telecommunications equipment 900 after the fiber optic cables 700 have been pulled through a conduit using cable pulling sleeves 800. In FIG. 30, the cable pulling sleeves have been removed from the fiber optic cables 700. The ends of the internal fiber optic cables 708 are connectorized for plugging into ports of the telecommunications equipment 900. For example, each end of the internal fiber optic cables 708 is terminated by a fiber optic connector 732 that can be plugged into a port of the telecommunications equipment 900. In some examples, the fiber optic connectors 732 are multi-fiber push on (MPO) connectors. Additionally, a distal end of a fiber optic cable 700 that is opposite of the ends of the internal fiber optic cables 708 can be terminated by a fiber optic connector 734.

The various embodiments described above are provided by way of illustration only and should not be construed to be limiting in any way. Various modifications can be made to the embodiments described above without departing from the true spirit and scope of the disclosure.

What is claimed is:

1. A fiber optic cable assembly, comprising:

a fiber optic cable, including:

a first section having a jacket surrounding at least one internal fiber optic cable, the jacket having an end;

a second section where the at least one internal fiber optic cable extends past the end of the jacket, and the second section having an end;

a strength member having a first portion extending inside the jacket in the first section, the strength member having a second portion forming a loop outside of the second section, and the strength member having a third portion extending outside of the jacket in the first section; and a protective wrap surrounding the third portion of the strength member; and a cable pulling sleeve coupled to the loop, the cable pulling sleeve defining a cavity for enclosing the end of the second section, wherein the cable pulling sleeve is coupled to the loop using a fastener, and wherein the fastener extends through the cable pulling sleeve and the loop.

2. The assembly according to claim 1, wherein the cable pulling sleeve includes a mesh material allowing the fastener to pass through an opening in the mesh material.

3. The assembly according to claim 1, wherein the cable pulling sleeve is coupled to the loop using at least two fasteners.

4. The assembly according to claim 1, further comprising at least one fiber optic connector on the end of the second section.

5. The assembly according to claim 1, further comprising a fiber optic connector terminating an end of the first section.

6. The assembly according to claim 1, further comprising a rip cord extending inside the jacket in the first section, the rip cord extending outside of the jacket at the second section, and the rip cord being configured to cut the jacket and protective wrap.

7. The assembly according to claim 1, wherein the fiber optic cable does not include a fan out arrangement.

8. A fiber optic cable, comprising:

a first section having a jacket surrounding at least one internal fiber optic cable, the jacket having an end;

a second section where the at least one internal fiber optic cable extends past the end of the jacket, and the second section having an end;

a strength member having a first portion extending inside the jacket in the first section, the strength member having a second portion forming a loop outside of the second section, and the strength member having a third portion extending outside of the jacket in the first section;

a protective wrap surrounding the third portion of the strength member; and a rip cord extending inside the jacket in the first section, the rip cord extending outside of the jacket at the second section, and the rip cord being configured to cut the jacket and protective wrap.

9. The fiber optic cable according to claim 8, wherein the protective wrap includes heat shrink wrap.

10. The fiber optic cable according to claim 8, wherein the protective wrap has a first end that extends past the end of the jacket, the protective wrap has a second end on the jacket, and the third portion of the strength member terminates at the second end of the protective wrap.

11. The fiber optic cable according to claim 8, wherein the strength member includes aramid yarns.

12. The fiber optic cable according to claim 8, wherein the fiber optic cable does not include a fan out arrangement for the at least one internal fiber optic cable.

13. The fiber optic cable according to claim 8, further comprising at least one fiber optic connector on the end of the second section.

14. The fiber optic cable according to claim 8, further comprising a fiber optic connector terminating an end of the first section.

15. A fiber optic cable assembly, comprising:

a fiber optic cable, including:

a first section having a jacket surrounding at least one internal fiber optic cable, the jacket having an end;

a second section where the at least one internal fiber optic cable extends past the end of the jacket, and the second section having an end;

a strength member having a first portion extending inside the jacket in the first section, the strength member having a second portion forming a loop outside of the second section, and the strength member having a third portion extending outside of the jacket in the first section;

a protective wrap surrounding the third portion of the strength member; and a rip cord extending inside the jacket in the first section, the rip cord extending outside of the jacket at the second section, and the rip cord being configured to cut the jacket and protective wrap; and a cable pulling sleeve coupled to the loop, the cable pulling sleeve defining a cavity for enclosing the end of the second section.

* * * * *